(12) United States Patent
Cao

(10) Patent No.: US 6,614,573 B1
(45) Date of Patent: Sep. 2, 2003

(54) SWITCHABLE INTERLEAVED CHANNEL SEPARATOR DEVICES AND SYSTEMS

(75) Inventor: Simon X. F. Cao, Fremont, CA (US)

(73) Assignee: Avanex Corporation, Fremont, CA (US)

(*) Notice: Subject to any disclaimer, the term of this patent is extended or adjusted under 35 U.S.C. 154(b) by 125 days.

(21) Appl. No.: 09/772,684

(22) Filed: Jan. 30, 2001

(51) Int. Cl.[7] .............................. G02F 1/03; H04J 14/06; G02B 5/30; G02B 6/26
(52) U.S. Cl. ...................... 359/246; 359/122; 359/124; 359/127; 359/484; 359/494; 359/497; 385/16; 385/17; 385/18; 385/24
(58) Field of Search ................................ 359/115, 124, 359/246, 122, 125, 111, 127, 130, 245, 484, 487, 495, 497, 900; 385/16, 24, 11, 17, 18, 31, 37, 33

(56) References Cited

U.S. PATENT DOCUMENTS

| | | |
|---|---|---|
| 5,912,748 A | 6/1999 | Wu et al. |
| 6,005,697 A | 12/1999 | Wu et al. |
| 6,097,518 A | 8/2000 | Wu et al. |
| 6,137,606 A | 10/2000 | Wu et al. |
| 6,169,604 B1 * | 1/2001 | Cao ............................ 356/519 |
| 6,169,828 B1 * | 1/2001 | Cao ............................ 385/31 |
| 6,310,690 B1 * | 10/2001 | Cao et al. .................... 356/519 |
| 6,310,993 B1 * | 10/2001 | Cao et al. .................... 385/24 |

FOREIGN PATENT DOCUMENTS

WO      WO9945738 A1    9/1999    ........... H04Q/11/00

* cited by examiner

Primary Examiner—Hung Xuan Dang
Assistant Examiner—Tuyen Tra
(74) Attorney, Agent, or Firm—Sawyer Law Group LLP

(57) ABSTRACT

The present invention provides an improved switchable interleaved channel separator device. The switchable interleaved channel separator device utilizes an adjustable reflective non-linear interferometer, which performs both switching and wavelength polarization sorting functions, so that overall complexity of the device is reduced. Further, because the adjustable non-linear interferometer is a reflection element, signal light paths are folded back upon one another so as to realize an overall reduction in the device's size, as well as the capability of performing optical couplings predominantly or wholly at a single side or at adjacent sides of the device.

21 Claims, 27 Drawing Sheets

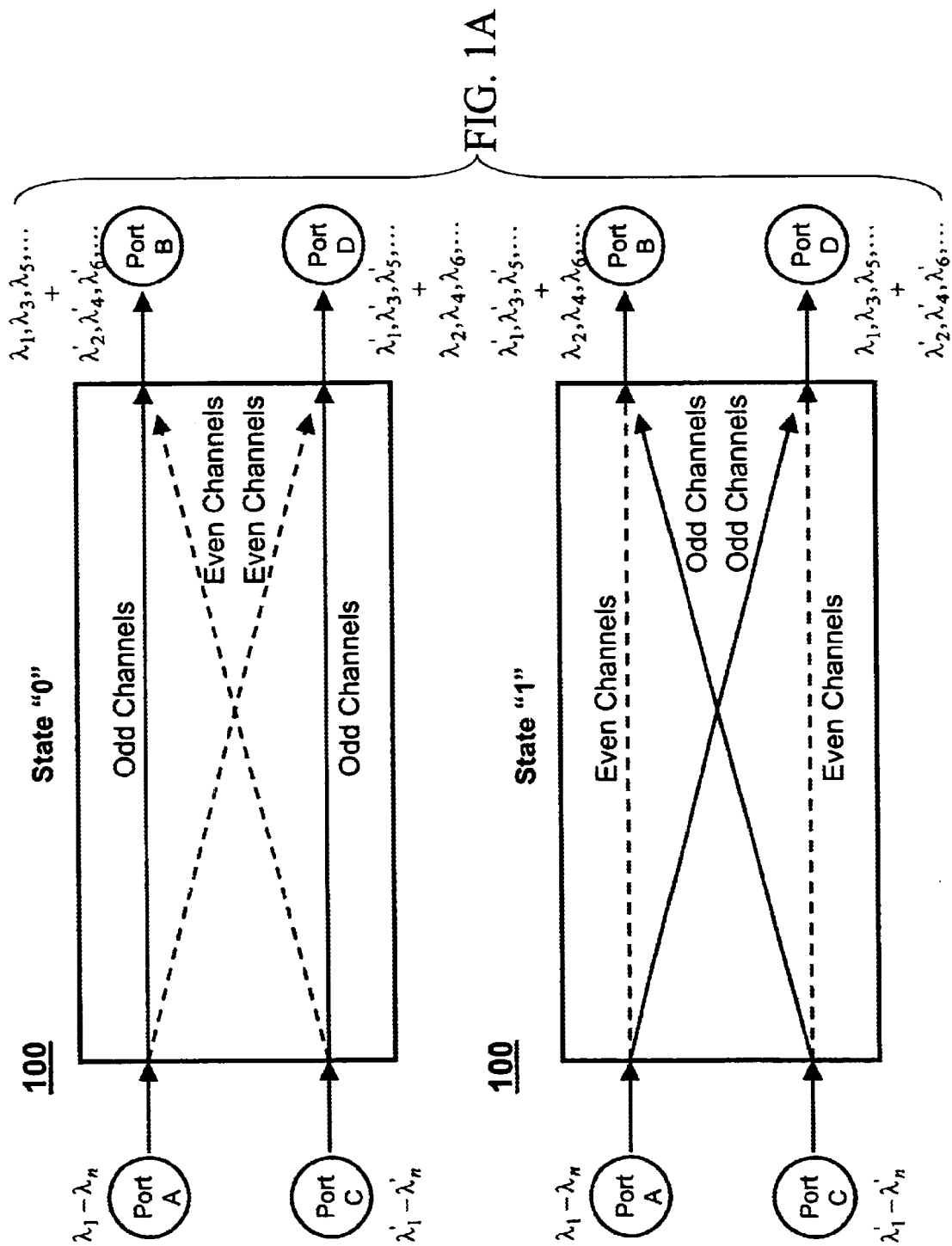

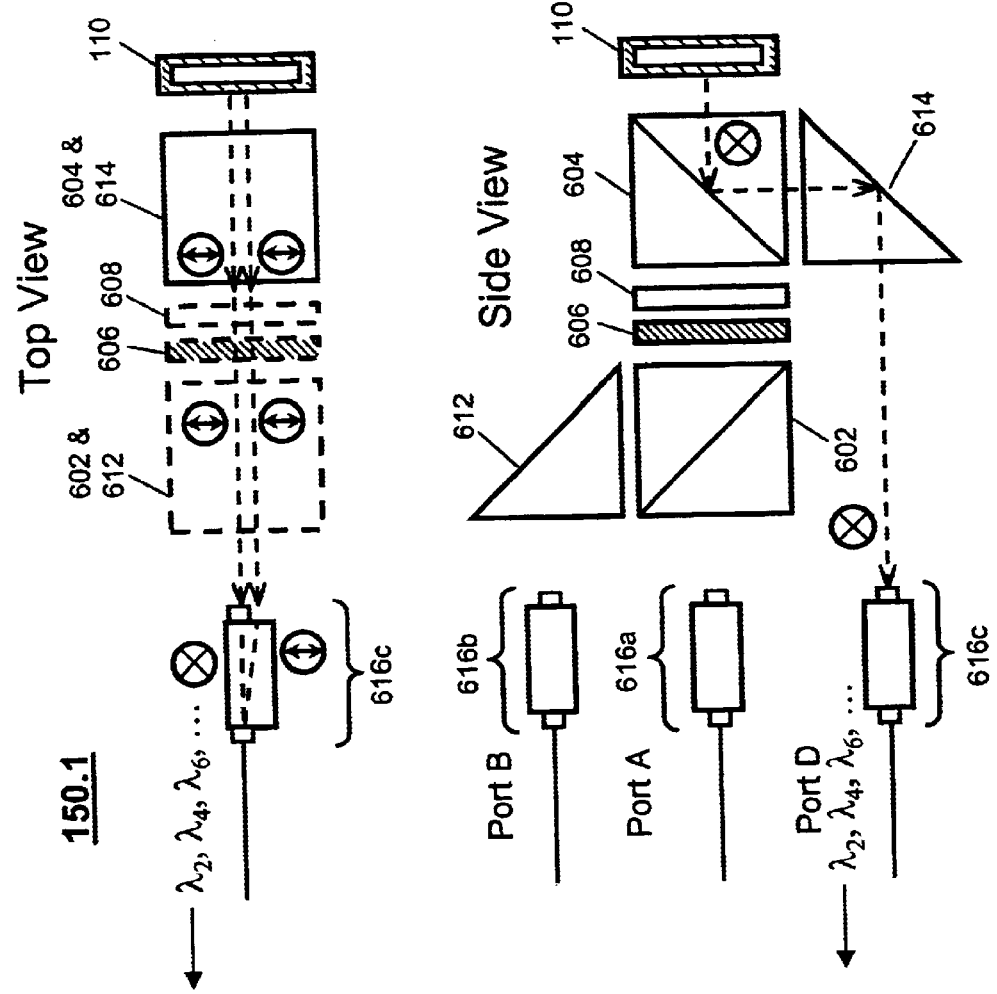

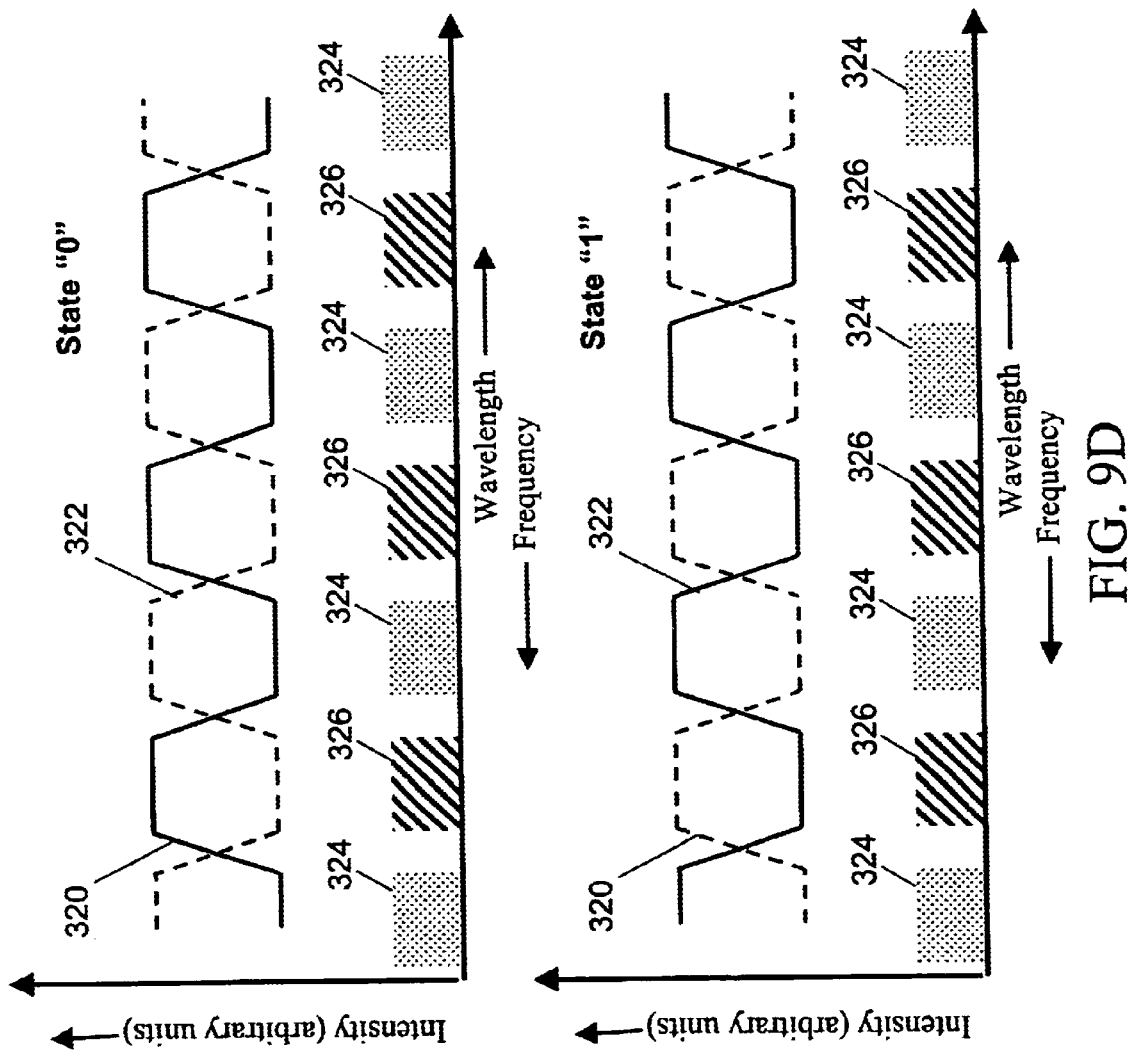

SWITCHABLE INTERLEAVED CHANNEL SEPARATOR DEVICES AND SYSTEMS

FIELD OF THE INVENTION

The present invention relates to optical networks, and more particularly, to optical switching, routing, multiplexing and de-multiplexing devices.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band."

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

Because of the increased network traffic resulting from the use of the WDM technique, there is an increasing need for sophisticated optical switching and routing devices which can quickly route or re-route numerous channels amongst various optical communications lines. FIG. 14 illustrates a known apparatus that performs this function. This apparatus 300 has two control states and serves to separate channels of the wavelength spectrum applied to an input port 11 and determines which of two output ports 13, 14 are coupled to each of the channels. The input WDM signal enters the first birefringent element 30 that spatially separates horizontal and vertically polarized components of the WDM signal. The first birefringent element 30 allows the vertically polarized portion of the optical signal to pass through without changing course. In contrast, horizontally polarized waves are redirected at an angle because of the birefringent walk-off effect. The horizontally polarized component travels along a path 301 as an extraordinary signal in the first birefringent element 30 while the vertically polarized component 302 travels as an ordinary signal and passes through without spatial reorientation.

Both the horizontally and vertically polarized components 301 and 302 are coupled to a switchable polarization rotator 40 under control of a control bit. The polarization rotator 40 consists of two sub-element rotators that form a complementary state, i.e. when one turns on the other turns off, such that, in general, the rotator 40 rotates the signals by either 0° (i.e., no rotation) or 90°. FIG. 14 illustrates one control state in which the signal 302 is rotated by 90° so that both signals 303, 304 exiting the rotator 40 have a horizontal polarization.

The stacked waveplates element 61 is a stacked plurality of birefringent waveplates at selected orientations that generate two eigen states. The first eigen state carries a first sub-spectrum with the same polarization as the input, and the second eigen state carries a complementary sub-spectrum at the orthogonal polarization. With horizontal polarizations 303, 304 input to the stacked waveplates element 61 as shown in FIG. 14, orthogonal vertical and horizontal polarizations are generated with the first spectral band residing in horizontal polarization and the second spectral band residing in vertical polarization. With vertical polarizations 303, 304 input to the stacked waveplates element 61 orthogonal vertical and horizontal polarizations are generated with the first spectral band residing in vertical polarization and the second spectral band residing in horizontal polarization.

The pairs of optical responses 305, 306 output by the stacked waveplates element 61 are coupled to a second birefringent element 50. This birefringent element 50 has a similar construction to the first birefringent element 30 and spatially separates the horizontally and vertically polarized components of the input optical signals 305 and 306. As shown in FIG. 14, the optical signals 305, 306 are broken into vertically polarized components 307, 308 containing the second spectral band and horizontally polarized components 309, 310 containing the first spectral band. Due to the birefringent walk-off effect, the two orthogonal polarizations that carry first spectral band 309, 310 in horizontal polarization and second set spectral band 307, 308 in vertical polarization are separated by the second birefringent element 50.

Following the second birefringent element 50, the optical elements on the input side of the second birefringent element 50 can be repeated in opposite order, as illustrated in FIG. 14. The second stacked waveplates element 62 has substantially the same composition as the first stacked waveplates element 61. The horizontally polarized beams 309, 310 input to the second stacked waveplates element 62, are further purified and maintain their polarization when they exit the second stacked waveplates element 62. On the other hand, the vertically polarized beams 307, 308 experience a 90° polarization rotation and are also purified when they exit the second stacked waveplates element 62. The 90° polarization rotation is due to the fact that the vertically polarized beams 307, 308 carry the second spectral band and therefore are in the complementary state of element 62. At the output of the stacked waveplates element 62, all four beams 311, 312 and 313, 314 have horizontal polarization.

To recombine the spectra of the two sets of beams 311, 312 and 313, 314, a second polarization rotator 41 and a second birefringent element 70 are used. The second rotator 41 has two sub-elements that intercept the four parallel beams 311–314. The two sub-elements of the second rotator 41 are set at a complementary state to the first rotator 40. In the state illustrated in FIG. 14, the polarization of beams 311 and 313 is rotated by 90°, and beams 312 and 314 are passed without change of polarization. This results in an orthogonal polarization pair 315, 316 and 317, 318 for each spectral band at the output of the second rotator 41. Finally, a second birefringent element 70 re-combines the two orthogonal polarizations 315, 316 and 317, 318 using the walk-off effect to produce two spectra that exit at ports 14 and 13, respectively. In the operational state shown in FIG. 14, the first and second spectral bands exit at ports 13 and 14, respectively. In the other operational state of the apparatus 300, the outputs of the two spectral bands are reversed.

Although the known apparatus 300 (FIG. 14) appears to be capable of performing its intended function, the structure of the apparatus 300 entails undesirable complexity since separate sets of elements perform the functions of switching the operational state of the apparatus 300 and of sorting the polarizations of channels according to their respective wavelengths. In the apparatus 300, the polarization rotators 40–41 and the wavelength filters 61–62, respectively, perform the switching and sorting operations. Further, since all the various functions of the apparatus 300 are performed by transmissive optical elements, the input port 11 and output ports 13–14 must necessarily be disposed at opposite sides of the apparatus 300. Such a disposition causes the apparatus 300 to be excessively large and creates difficulty for coupling the apparatus 300 to fiber ferrules or ribbon cables in which all the fibers are disposed within a single bundle or group.

Accordingly, there exists a need for an improved switchable interleaved channel separator. The improved switchable interleaved channel separator should perform the functions of switching and wavelength polarization sorting within a single element to reduce size and complexity of the apparatus. These functions should be performed by a reflection element so as to facilitate external optical coupling to the apparatus predominantly at a single side or at adjacent sides of the separator. The present invention addresses such a need.

SUMMARY OF THE INVENTION

The present invention provides an improved switchable interleaved channel separator device. The switchable interleaved channel separator device utilizes an adjustable reflective non-linear interferometer, which performs both switching and wavelength polarization sorting functions, so that overall complexity of the device is reduced. Further, because the adjustable non-linear interferometer is a reflection element, signal light paths are folded back upon one another so as to realize an overall reduction in the device's size, as well as the capability of performing optical couplings predominantly or wholly at a single side or at adjacent sides of the device.

BRIEF DESCRIPTION OF THE FIGURES

FIG. 1a is a functional signal routing diagram of a switchable interleaved channel separator device in accordance with the present invention, as a 2×2 device.

FIGS. 6a–6c each is a top view and a side view of a third preferred embodiment of the switchable interleaved channel separator device in accordance with the present invention.

FIG. 9d is a pair of schematic graphs of the spectrum of the polarization-rotated light and the spectrum of the polarization-non-rotated light reflected from an adjustable nonlinear interferometer in two different operational states.

DETAILED DESCRIPTION

The present invention provides an improved switchable interleaved channel separator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIG. 1a through 13 in conjunction with the discussion below.

FIG. 1a is a functional signal routing diagram of a switchable interleaved channel separator device in accordance with the present invention, as a 2×2 device. The switchable interleaved channel separator device 100 can be operated in either a first operational configuration, state "0" or in a second operational configuration, state "1", as shown in the upper and lower diagrams of FIG. 1a, respectively. In the state "0", odd-channel signals input to the switchable interleaved channel separator device 100 from Port A and from Port C are directed to Port B and to Port D, respectively, whereas even channel signals input to the switchable interleaved channel separator device 100 from Port A and from Port C are directed to Port D and to Port B, respectively. For instance, as shown in the upper diagram of FIG. 1a, in the state "0" the output at Port B consists of the odd channels ($\lambda_1, \lambda_3, \lambda_5 \ldots$) from the first composite optical signal $\lambda_1-\lambda_n$ input at Port A plus the even channels ($\lambda_2'$, $\lambda_4'$, $\lambda_6'$ ...) from the second composite optical signal $\lambda_1'-\lambda_n'$ input at Port C. Further, in the state "0", the output at Port D consists of the odd channels ($\lambda_1'\lambda_3'$, $\lambda_5'$ ...) from the second composite optical signal plus the even channels ($\lambda_2$, $\lambda_4$, $\lambda_6$ ...) from the first composite optical signal. In the state "1", the pathways of the odd channels and the even channels are reversed from those in the state "0" as shown in the lower diagram of FIG. 1a. In this way, the device 100 functions as a dense wavelength division multiplexer and de-multiplexer that discriminates amongst the pathways of odd and even channels and also functions as a 2×2 switch.

Figure 1B:
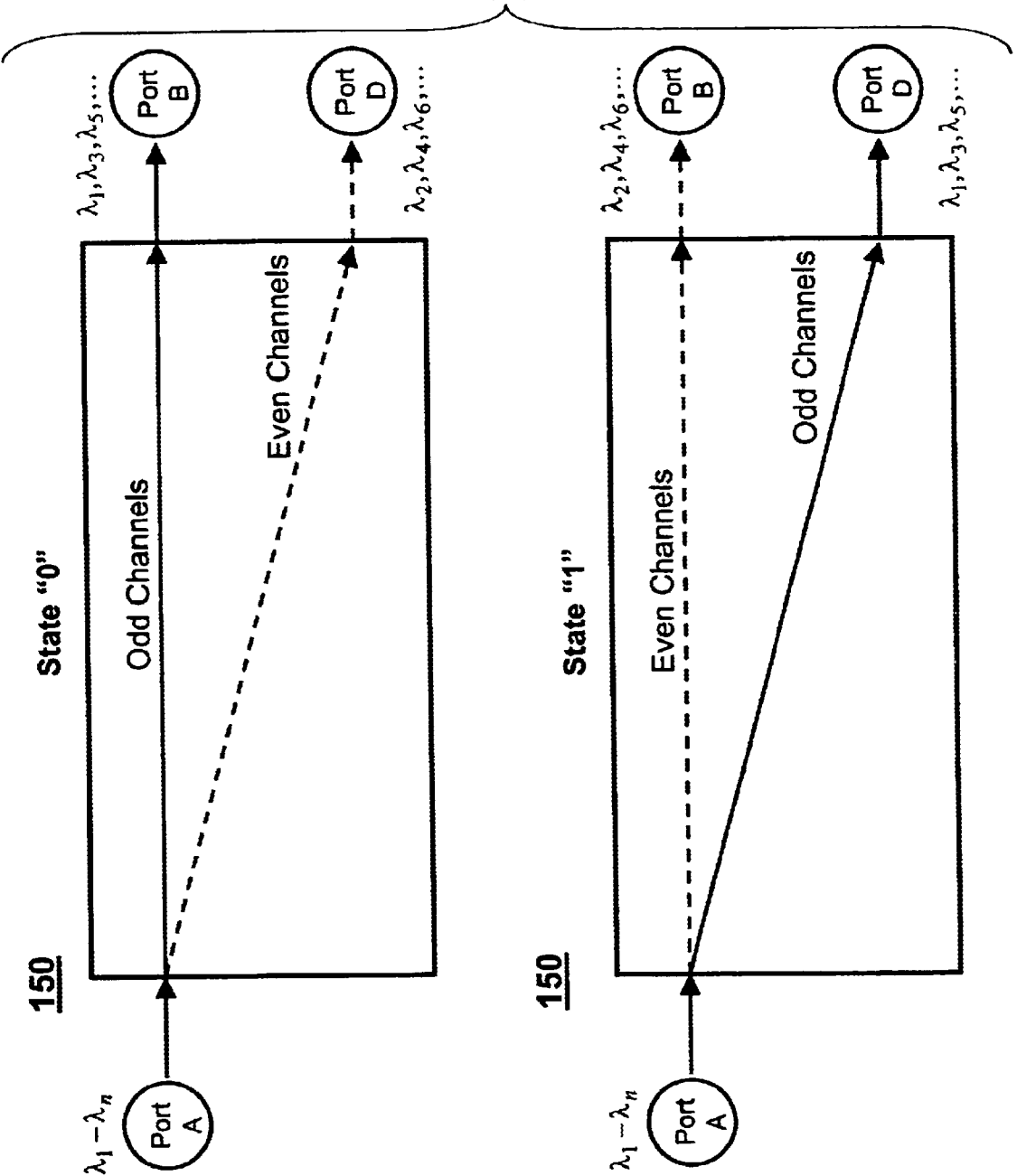
FIG. 1b is a functional signal routing diagram of the switchable interleaved channel separator device in accordance with the present invention, as a 1×2 device.

FIG. 1b is a functional signal routing diagram of the switchable interleaved channel separator device in accordance with the present invention, as a 1×2 device. The switchable interleaved channel separator device 150 (FIG. 1b) operates similarly to the device 100 (FIG. 1a) except that the device 150 only comprises one input port (Port A). In the state "0", the switchable interleaved channel separator device 150 directs odd channels to Port B and even channels to Port D. In the state "1", the odd channels are directed to Port D and the even channels are directed to Port B. In this way, the device 150 functions as a dense wavelength division multiplexer and de-multiplexer that discriminates amongst the pathways of odd and even channels and also functions as a 1×2 switch.

Figure 2:
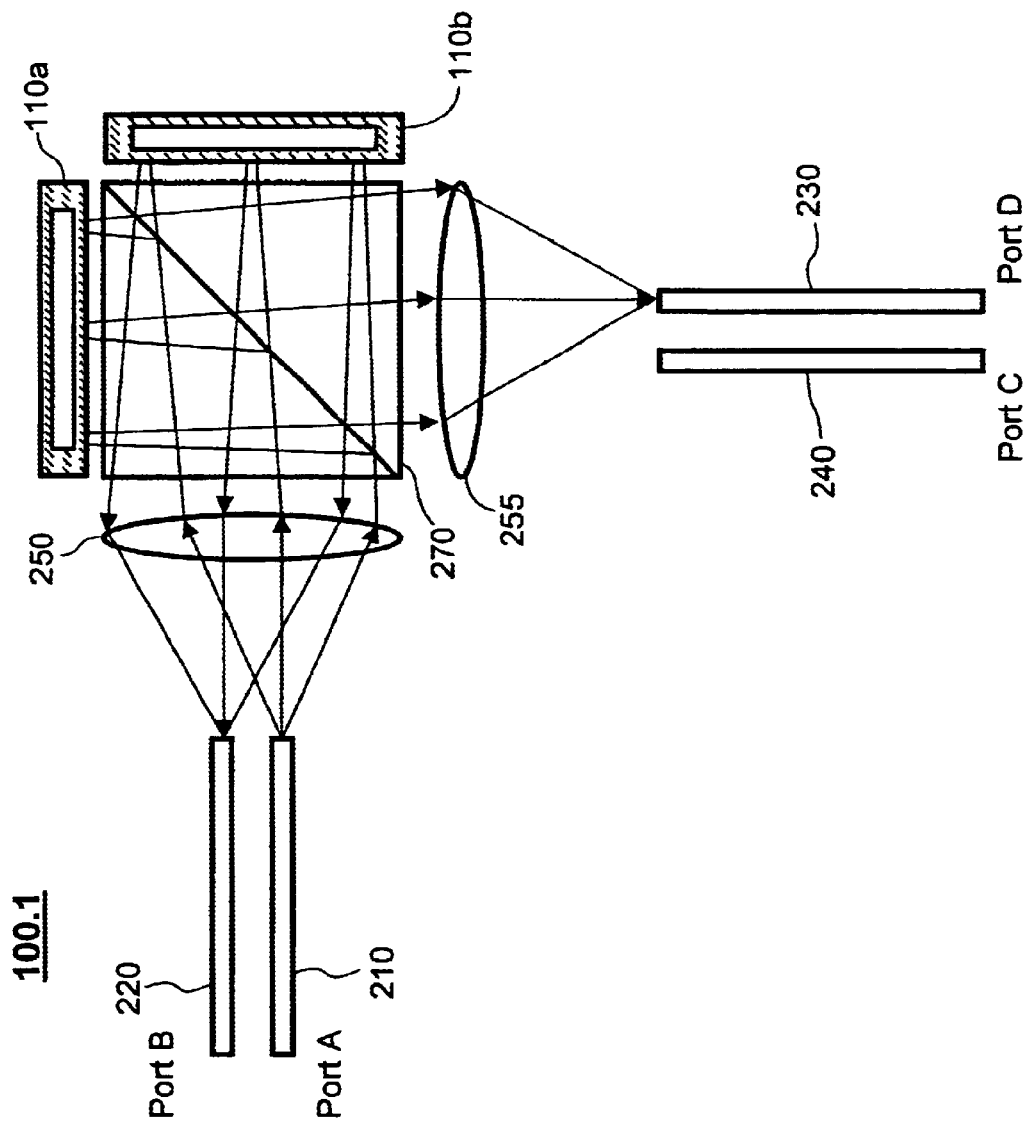
FIG. 2 is a side view of a first preferred embodiment of the switchable interleaved channel separator device in accordance with the present invention.

FIG. 2 is an illustration of a first preferred embodiment of a switchable interleaved channel separator device in accordance with the present invention. The switchable interleaved channel separator device 100.1, shown in FIG. 2, is a modified version of an apparatus disclosed in U.S. Pat. No. 6,130,971, that is assigned to the assignee of the present applicant and which is incorporated herein by reference in its entirety. The 2×2 switchable interleaved channel separator device 100.1 (FIG. 2) comprises a first input optical fiber 210 and a second input optical fiber 240 for inputting optical signals and first 220 and second 230 output optical fibers for outputting optical signals. As an input composite optical signal leaves the first input optical fiber 210, it diverges. A first lens 250 collimates the input composite optical signal and directs it toward a polarization beam splitter 270 which decomposes the signal into two sub-signals having mutually orthogonal polarizations. The s-polarized portion of the input composite optical signal polarized parallel to a plane in the polarization beam splitter 270 is reflected towards a first adjustable non-linear interferometer 110a. The p-polarized portion of the signal polarized perpendicularly to the plane in the polarization beam splitter 270 passes through towards a second adjustable nonlinear interferometer 110b.

Each of the adjustable non-linear interferometers 110a and 110b comprising the switchable interleaved channel separator device 100.1 is a modified instance of an invention disclosed in U.S. Pat. Nos. 6,169,604 and 6,310,690, both of which are assigned to the assignee of the present application and which are incorporated herein by reference in their entirety. Each of the adjustable non-linear interferometers 110a and 110b has the property such that, if the light beam reflected therefrom is an optical signal comprised of a plurality of wavelength division multiplexed channels and the light of each channel is linearly polarized, then the light of a first set of channels (for instance the "even" channels) is reflected with a 90° rotation of its polarization plane direction whilst the light of the remaining set of channels (for instance, the "odd" channels) is reflected with unchanged polarization. When light is input from the first input optical fiber 210 as shown in FIG. 2, the light comprising the set of channels whose polarization is rotated (the even channels, in this example) is directed to the second output optical fiber 230 and the light comprising the other set of channels (the odd channels, in this example) is directed to the first output optical fiber 220. When light is input from the second input optical fiber 240, the light comprising the set of channels whose polarization is rotated is directed to the first output optical fiber 220 and the light comprising the other set of channels is directed to the second output optical fiber 230.

It may be noted from the above description that, if fiber 210 is defined as Port A, fiber 220 is defined as Port B, fiber 230 is defined as Port D and fiber 240 is defined as Port C, then the device 100.1 functions as shown in the upper diagram of FIG. 1a. If the fiber 240 (Port C) is either absent or unutilized, then the device 100.1 functions as 1×2 device, as shown in the upper diagram of FIG. 1b. Furthermore, each of the adjustable non-linear interferometers 110a–110b of the switchable interleaved channel separator device 100.1 comprises two mutually exclusive states, whereby the set of channels (either even or odd) whose polarization plane is rotated may be selected. It is assumed that the two adjustable non-linear interferometers 110a–110b are always both in the same state. Thus, by toggling both adjustable non-linear interferometers 110a–110b from their first to second states and vice versa by mechanisms discussed further below, the output pathways of odd and even channels may be reversed. Thus, the device 100.1 can toggle between the two states shown in FIG. 1a.

Figure 3:
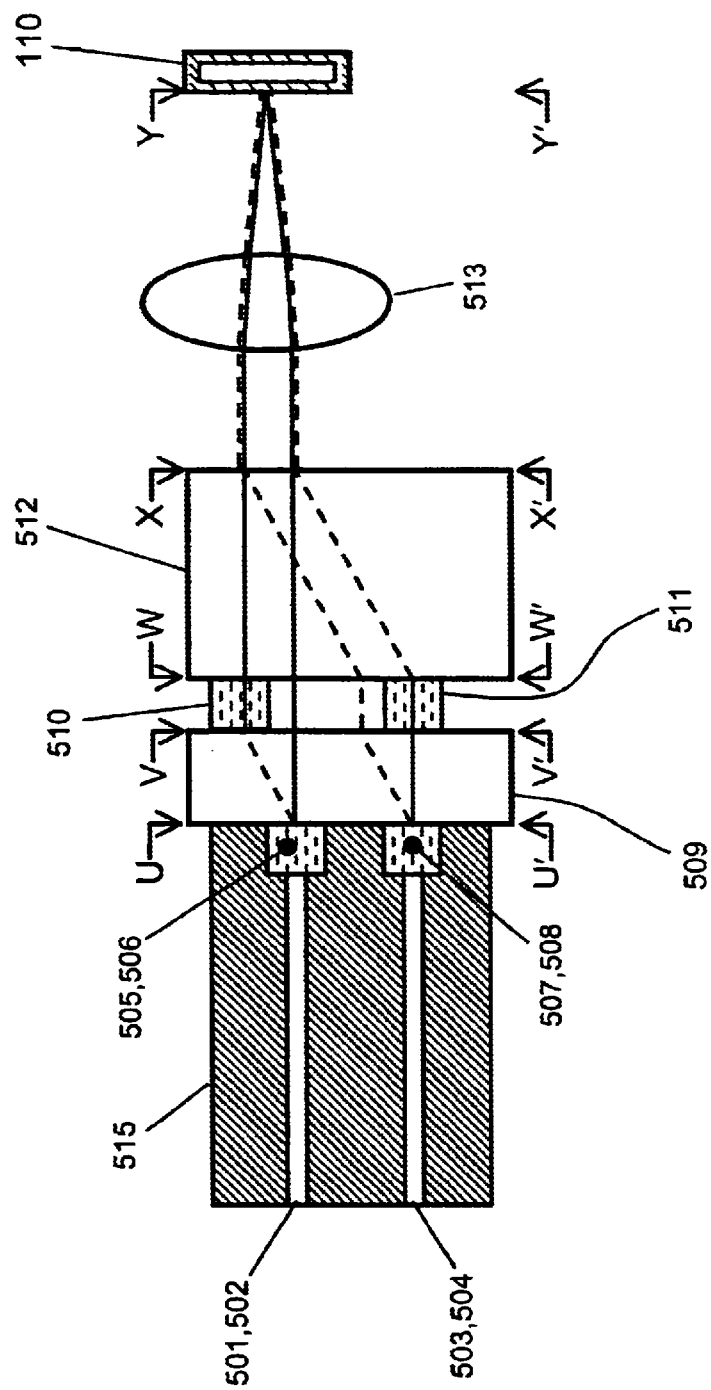
FIG. 3 is a side view of a second preferred embodiment of the switchable interleaved channel separator device in accordance with the present invention.

FIG. 3 shows a side view of a second preferred embodiment of the switchable interleaved channel separator device in accordance with the present invention. The switchable interleaved channel separator device 100.2, shown in FIG. 3, is a modified version of an apparatus disclosed in a co-pending U.S. Patent Application entitled "High-Isolation Dense Wavelength Division Multiplexer Utilizing Birefringent Plates and a Non-Linear Interferometer", Ser. No. 09/404,005, filed Sep. 23, 1999. Applicant incorporates this patent application herein by reference in its entirety. In the device 100.2, reference numeral 515 is a four fiber ferrule and reference numerals 501, 502, 503 and 504 are four optical fibers, Fiber A, Fiber B, Fiber C and Fiber D, respectively, contained within and securely bonded to ferrule 515.

Figure 4:
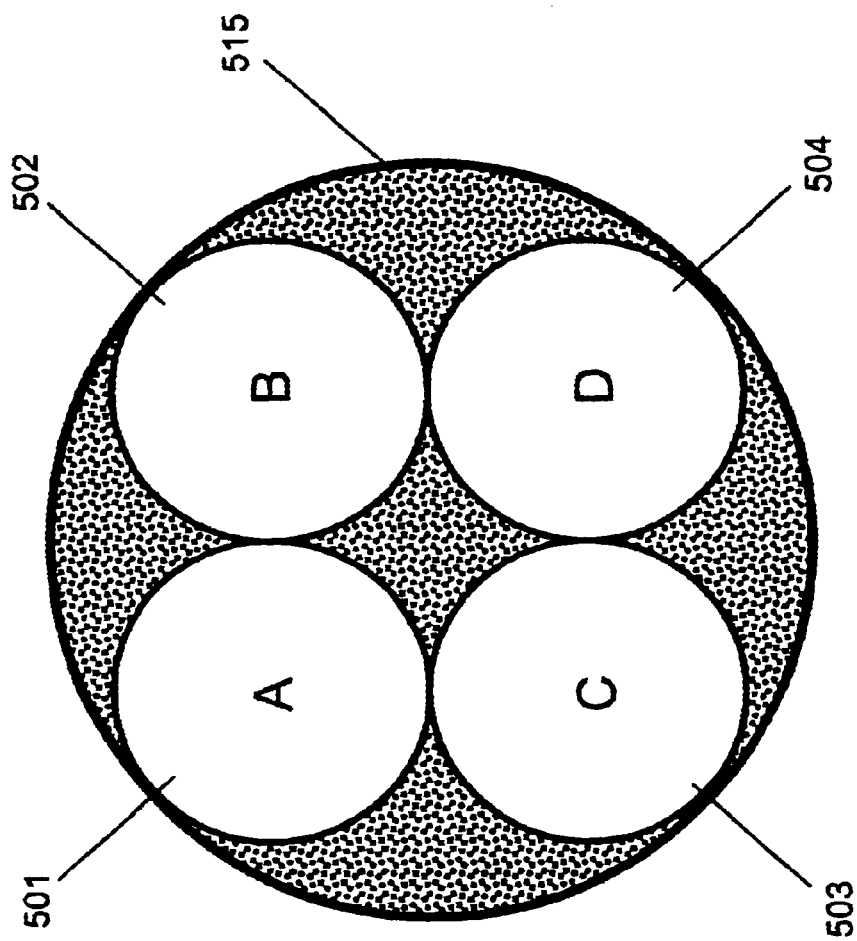
FIG. 4 is an end view of the fiber configuration of the input and output fibers utilized within the second preferred embodiment of the switchable interleaved channel separator device in accordance with the present invention.

FIG. 4 shows an end view of the fiber configuration as viewed from the left side of the device of FIG. 3 utilized within the second preferred embodiment of the switchable interleaved channel separator device 100.2 in accordance with the present invention. Four collimator lenses, reference numerals 505, 506, 507 and 508, are incorporated into the end of ferrule 515 such that each collimator receives light from and directs light to exactly one of the fibers, specifically Fiber A 501, B 502, C 503 and D 504, respectively.

Disposed adjacent to the end of ferrule 515 is a first birefringent walk-off plate 509 that has the property of separating any signal light ray emanating from any of the fibers 501, 502, 503 or 504 into two physically separated linearly polarized sub-signal rays—one innermost and one outermost sub-signal ray. Because four fibers are contained within ferrule 515, eight separate sub-signals are so defined and are comprised of four outermost and four innermost sub-signals. The outermost and innermost sub-signals from both Fiber A 501 and Fiber B 502 comprise e-rays and o-rays, respectively, in their traverse through birefringent plate 509. Conversely, the outermost and innermost sub-signals from both Fiber C 503 and Fiber D 504 comprise o-rays and e-rays, respectively, in their traverse through birefringent plate 509. The polarization plane directions of these e-rays and o-rays are arbitrarily referred to as "horizontal" and "vertical," respectively.

Disposed adjacent to the first birefringent plate 509 and on the side of plate 509 opposite to ferrule 515 are both a first half-wave plate 510 and a second half-wave plate 511. Half-wave plate 510 is aligned so as to intercept only the two outermost sub-signals arising from Fiber A 501 and Fiber B 502. Likewise, half-wave plate 511 is aligned so as to intercept only the two outermost sub-signals arising from Fiber C 503 and Fiber D 504. A second birefringent walk-off plate 512 is disposed adjacent to the two half-wave plates 510 and 511 on the side opposite to the first birefringent plate 509. The thickness of birefringent plate 512 is designed so as to give an offset of one of the rays propagating therethrough equivalent to the center-to-center distance between a pair of fibers. A lens or lens assembly 513 is disposed to the side of the second birefringent walk-off plate 512 opposite to the half wave plates 510 and 511. Finally, an adjustable non-linear interferometer 110, similar to each of the adjustable non-linear interferometers 110a–110b shown in FIG. 2, is disposed at the focal point of lens 513 opposite to the birefringent plate 512.

Figure 5A:
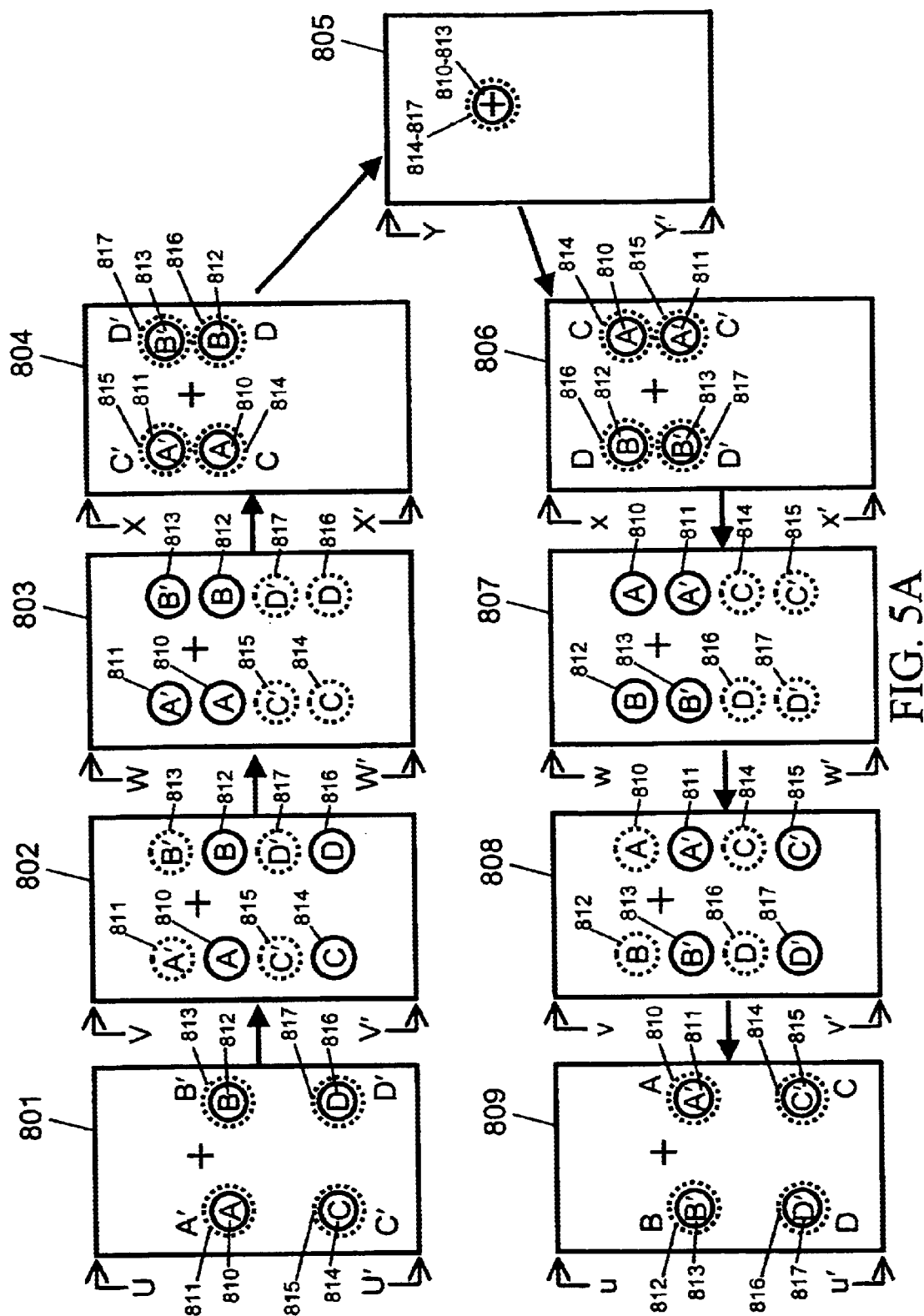
FIG. 5a is a sequence of cross sectional views through the switchable interleaved channel separator device of FIG. 3 illustrating the locations and polarization states of fiber images created by the light of signals and sub-signals of a first set of wavelength division multiplexed channels.
Figure 5B:
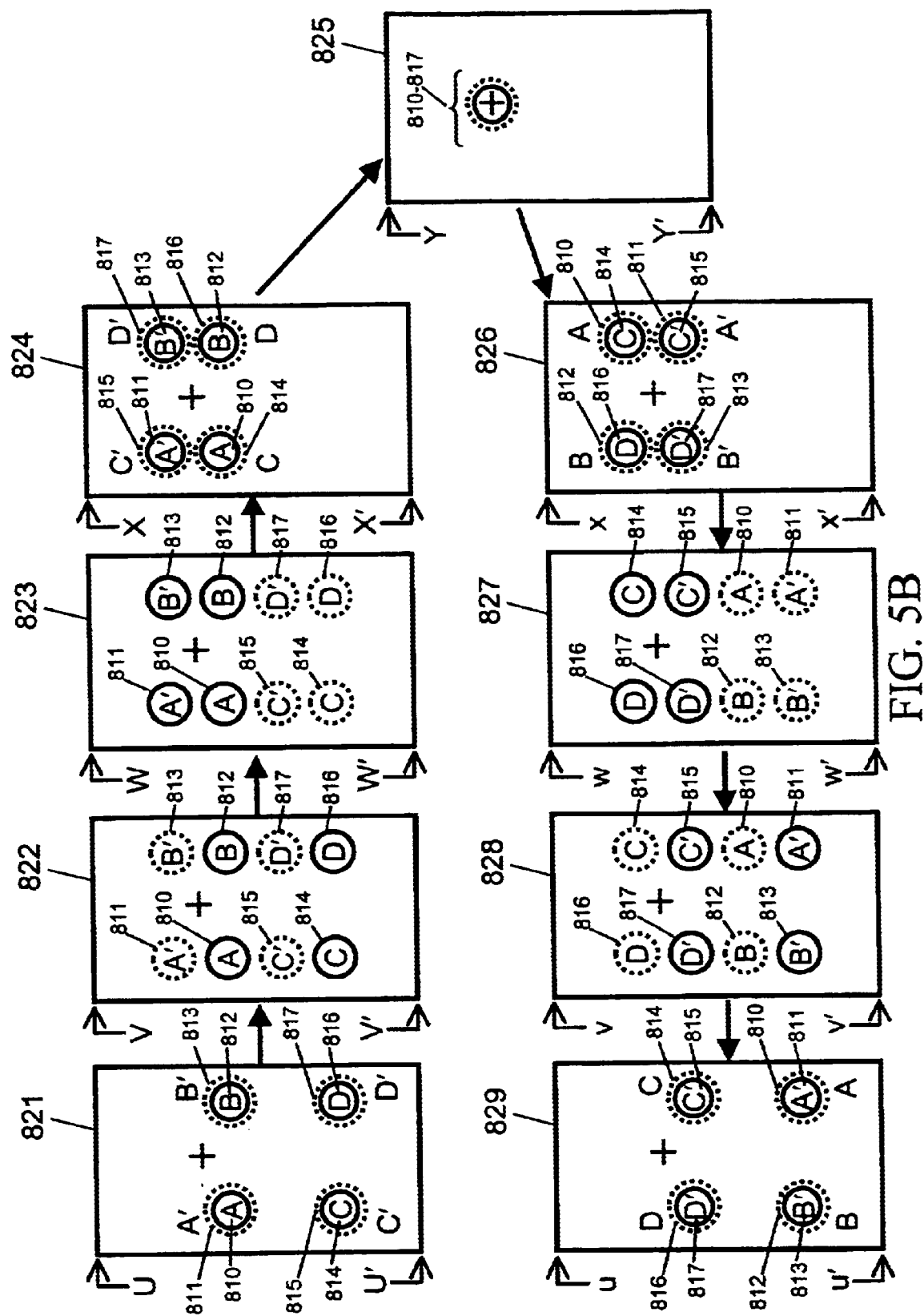
FIG. 5b is a sequence of cross sectional views through the switchable interleaved channel separator device of FIG. 3 illustrating the locations and polarization states of fiber images created by the light of signals and sub-signals of a second set of wavelength division multiplexed channels.

The operation of the switchable interleaved channel separator device 100.2 is illustrated in FIGS. 5a and 5b. FIG. 5a is a sequence of cross sectional views 801–809 through the switchable interleaved channel separator device 100.2 (FIG. 3) illustrating the locations and polarization states of fiber images created by the light of signals and sub-signals of a first set of wavelength division multiplexed channels, whose polarization is not rotated by the adjustable non-linear interferometer 110. FIG. 5b is a sequence of cross sectional views 821–829 through the switchable interleaved channel separator device 100.2 (FIG. 3) illustrating locations and polarization states of fiber images created by the light of signals and sub-signals of a second set of wavelength division multiplexed channels, that are interleaved with the first set and whose polarization is rotated by 90° upon reflection from the adjustable non-linear interferometer 110. The identity of the channel set (e.g., either odd or even) whose light ray polarization is rotated depends upon the particular state of the adjustable non-linear interferometer 110. Thus, when the state of the adjustable non-linear interferometer 110 is in a first state "0", FIG. 5a illustrates the pathways of odd channels and FIG. 5b illustrates the pathways of even channels. In a second state "1", FIG. 5a illustrates the pathways of even channels and FIG. 5b illustrates the pathways of odd channels.

These cross-sections of FIGS. 5a–5b are all drawn as viewed from the left side of the device of FIG. 3 and are taken at the labeled cross-sectional planes U–U', V–V', W–W', X–X', and Y–Y' of FIG. 3. In FIGS. 5a and 5b, circles drawn with solid lines are used to denote sub-signals comprised of vertically polarized light, circles drawn with dotted lines are used to denote sub-signals comprised of horizontally polarized light and adjacent solid and dotted circles are used to denote overlapping sub-signals of differing polarization or else signals of mixed or random polarization. The sizes of these circles have no physical significance. Reference numerals 810–811 represent fiber images of light originally input from Fiber A; reference numerals 812–813 represent fiber images of light originally input from Fiber B; reference numerals 814–815 represent fiber images of light originally input from Fiber C and reference numerals 816–817 represent fiber images of light originally input from Fiber D.

For a more-detailed description of the operation of the device 100.2 as illustrated in FIGS. 5a–5b, please refer to the above-mentioned co-pending U.S. patent application Ser. No. 09/404,005. It is important to note that, when the adjustable non-linear interferometer 110 is in state "0", odd-channel signal light input from Fiber A and Fiber C is output to Fiber B and Fiber D, respectively (FIG. 5a) whereas even-channel signal light input from Fiber A and Fiber C is output to Fiber D and Fiber B, respectively (FIG. 5b). Conversely, when the adjustable non-linear interferometer 110 is in state "1", the output locations of odd and even channels are reversed. Therefore the device 100.2 operates according to the scheme illustrated in FIG. 1a. If the Fiber C is unused or absent, then the device 100.2 may be considered to operate as shown in FIG. 1b.

Figure 6A:
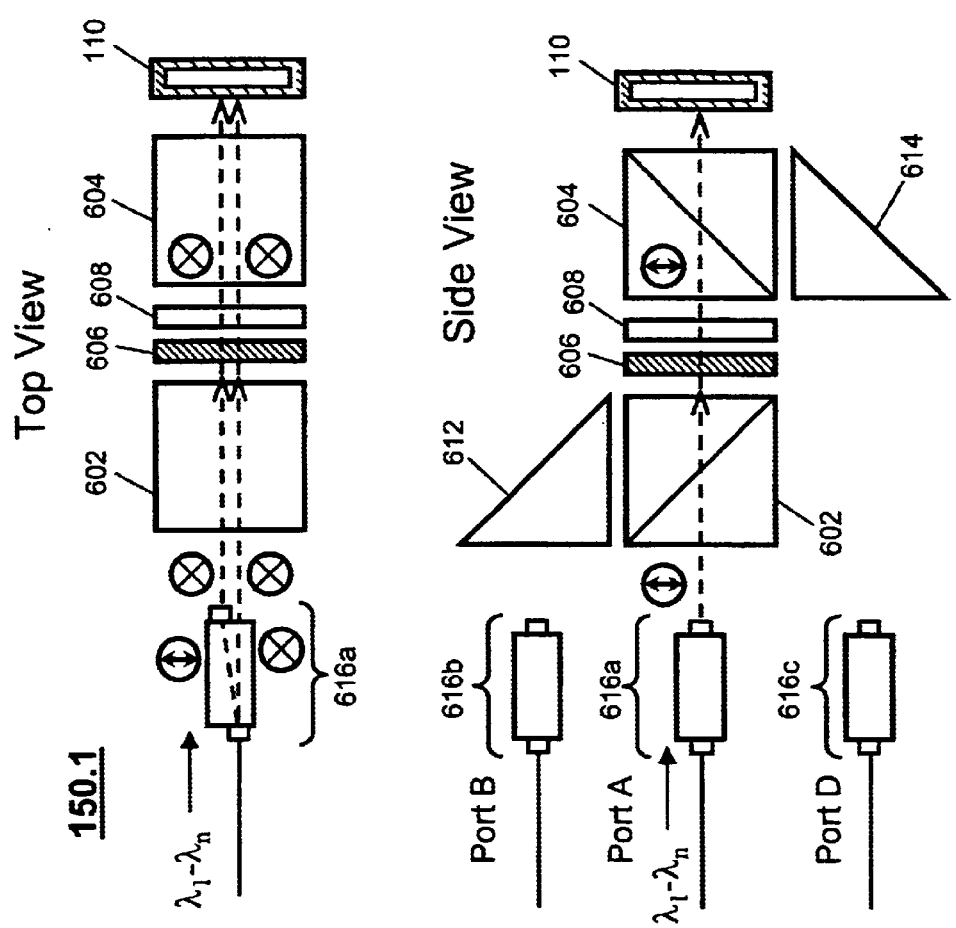
Figure 6B:
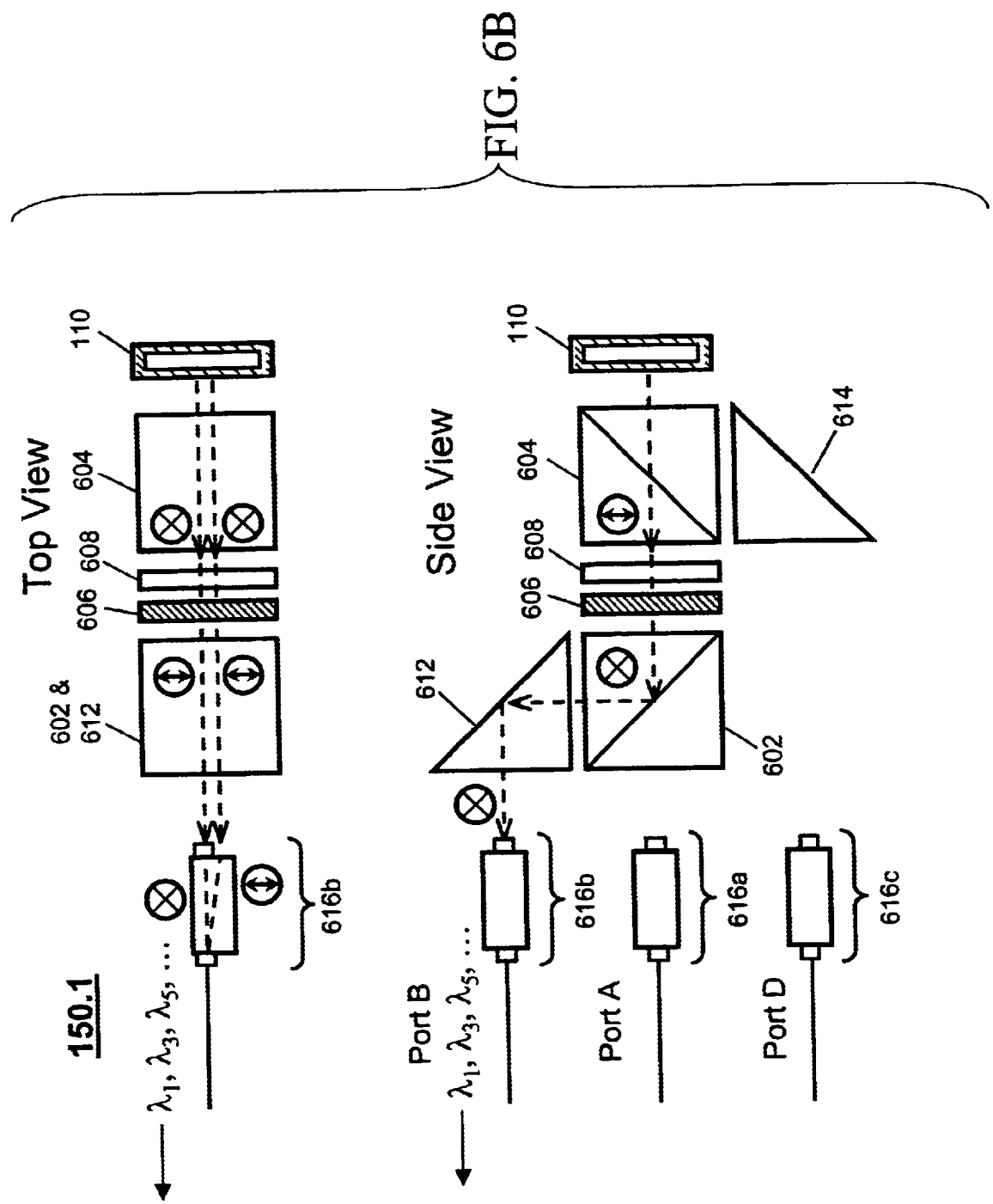

FIGS. 6a–6c each illustrate a side view and a top view of a third preferred embodiment of the switchable interleaved channel separator device in accordance with the present invention. The 1×2 switchable interleaved channel separator device 150.1, shown in FIGS. 6a–6c, is a modified version of an apparatus disclosed in a co-pending U.S. Patent Application entitled "Multi-Functional Optical Device Utilizing Multiple Polarization Beam Splitters and Non-Linear Interferometers," Ser. No. 09/630,891, filed on Aug. 2, 2000. Applicant incorporates this patent application herein by reference in its entirety. The 1×2 switchable interleaved channel separator device 150.1 (FIGS. 6a–6c) receives input from a first optical port 616a and separates the channels therein into a first set of channels and a second set of channels that are interleaved with the first set of channels, wherein the first set is output to a first output optical port 616b and the second set is output to a second output optical port 616c, respectively. For reasons further detailed below, the optical ports 616a–616c are also referred to herein as polarizing ports.

As shown in FIG. 6a, the switchable interleaved channel separator device 150.1 further comprises a first 602 and a second 604 polarization beam splitter (PBS) between which are disposed a non-reciprocal optical rotation element 606 and a reciprocal optical rotation element 608. The first PBS 602 receives optical input from the input port 616a which is disposed adjacent to a side of the PBS 602 opposite to the non-reciprocal rotator 606 and reciprocal rotator 608. An adjustable non-linear interferometer 110 is disposed adjacent to the second PBS 604 at a side opposite to the non-reciprocal rotator 606 and reciprocal rotator 608. The input port 616a, first PBS 602, second PBS 604, non-reciprocal rotator 606, reciprocal rotator 608 and non-linear interferometer 110 are disposed along a line which defines a main axis or dimension of the device 150.1. Also shown in FIGS. 6a–6c, as well as in several following figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

The switchable interleaved channel separator device 150.1 is further comprised of a first 612 and a second 614 optical reflector that are disposed adjacent to respective faces of the first PBS 602 and second PBS 604, neither of which faces intersect the main axis of the device 150.1. As shown in FIG. 6a, the optical reflectors 612–614 comprise right-angle prisms, but could also comprise mirrors. The two PBS's 602–604 each have the property of transmitting signal light comprising a first polarization (p-polarization) therethrough along the main axis whilst simultaneously deflecting signal light comprising a second polarization (s-polarization) to the adjacent optical reflector. Finally, the first output port 616b and the second output port 616c are disposed such that they receive light deflected by the first 612 and second 614 optical reflector, respectively.

Figure 6D:
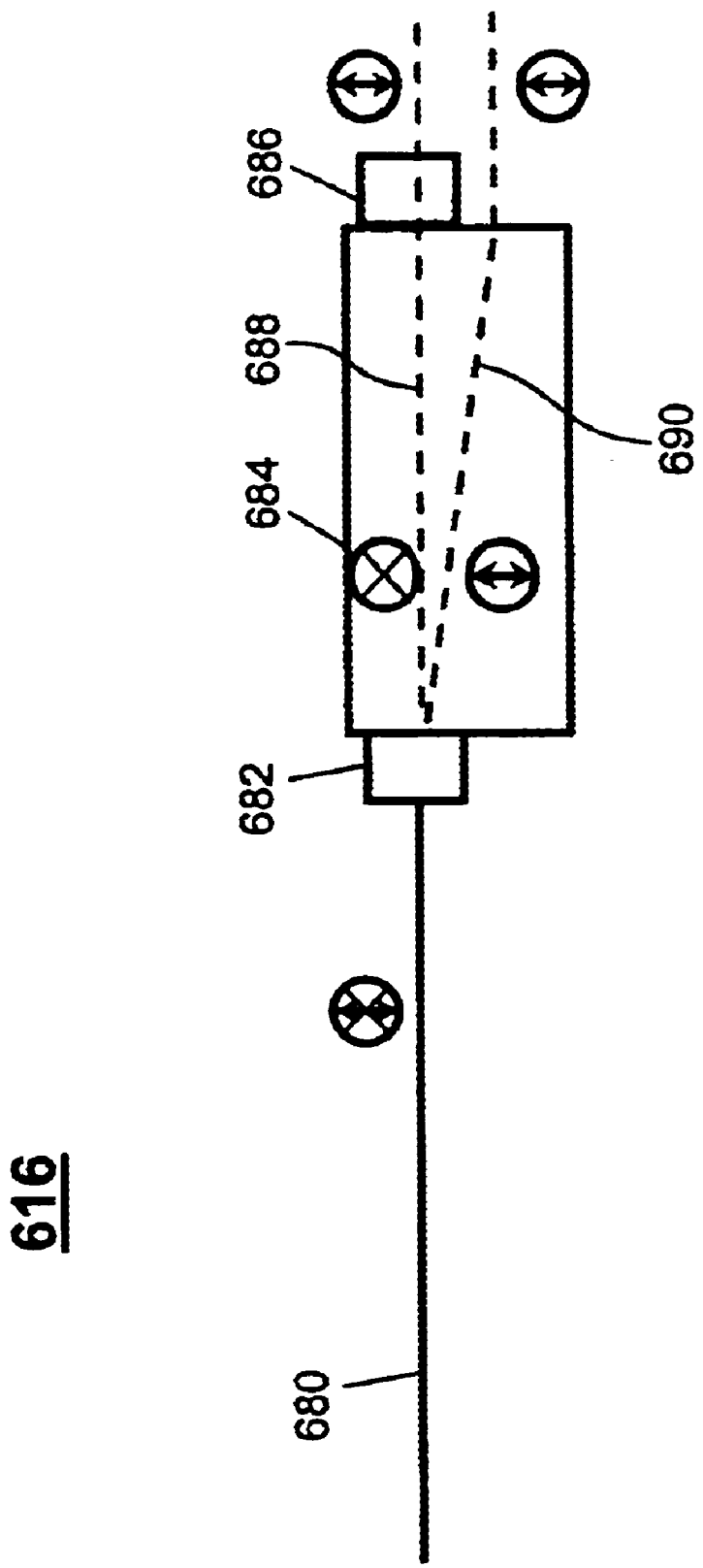
FIG. 6d is a view of a polarizing input/output port assembly utilized within the third preferred embodiment of the switchable interleaved channel separator device in accordance with the present invention.

FIG. 6d is a view of a polarizing input/output port assembly 616 utilized within the third preferred embodiment of the switchable interleaved channel separator device 150.1 in accordance with the present invention. The port 616 is herein termed a "polarizing port" because the port outputs light comprising only a single linear polarization orientation and can only receive light comprising the same linear polarization orientation.

The polarizing port 616 (FIG. 6d) comprises an optical fiber 680, an optical collimator 682, a birefringent walk-off plate 684 and a reciprocal optical rotator 686. The optical collimator 682 is optically coupled to the optical fiber 680 and either receives input from or directs output to the fiber 680. The birefringent walk-off plate 684 of the polarizing port 616 (FIG. 6d) is optically coupled to the collimator 682 at a side opposite to the fiber 680 and has the property of physically separating an unpolarized light beam received from collimator 682 into a deflected light beam 690 and an un-deflected light beam 688. The deflected light 690 comprises an e-ray having a first linear polarization orientation and the un-deflected light 688 comprises an o-ray having a second linear polarization orientation perpendicular to that of the e-ray. The reciprocal optical rotator 686, which is optically coupled to the birefringent walk-off plate 684 at a side opposite to the collimator 682, is disposed so at to intercept the path of only one of the two beams 688–690. The reciprocal optical rotator 686 rotates the polarization orientation of the intercepted beam by 90° so as to be parallel to that of the other beam. In the reverse light propagation direction, that is, when the polarizing port 616 is utilized as an output port, the optical rotator 686 rotates the polarization orientation of only one of two beams so that the beams subsequently comprise mutually orthogonal polarization orientations and such that these two beams are subsequently combined upon passage through the birefringent walk-off plate 684. The reciprocal optical rotator. 686 may be disposed so as to intercept either the o-ray 688 or the e-ray 690.

The pathways and polarization orientations of forward propagating input signal rays within the switchable interleaved channel separator device 150.1 are shown in both top view (top diagram) and side view (lower diagram) in FIG. 6a. The return pathways (that is, the pathways after reflection from and interaction with the adjustable non-linear interferometer 110) of a first set of channels and of a second set of channels through the switchable interleaved channel separator device 150.1 are respectively shown in FIG. 6b and FIG. 6c.

Explicit details of the operation of the switchable interleaved channel separator device 150.1 are provided in the aforementioned co-pending U.S. Patent Application having Ser. No. 09/630,891. In summary, light of a composite optical signal, which is comprised of a plurality of wavelength division multiplexed channels $\lambda_1$–$\lambda_n$, is input to the device 150.1 from input port 616a with a single linear polarization orientation and propagates through the device 150.1 to the adjustable non-linear interferometer 10 (FIG. 6a). The adjustable non-linear interferometer 110 reflects the signal light such that the polarization plane of one set of channels is rotated by 90° whilst that of a second set of channels interleaved with the first set is not rotated. Further, the adjustable non-linear interferometer 110 can operate in either one of two states so as to select the particular set of channels whose light incurs polarization rotation. The light of the reflected channels then returns through the device 150.1 such that the light comprising the various channels is separated according to its polarization orientation.

The polarization orientations and pathways of the channels through the device 150.1 may be traced out using FIGS. 6a–6c so as to verify that the device 150.1 operates as a 1×2 device according to the scheme shown in FIG. 1b. In these figures, it is assumed that the polarization plane of light comprising the even channels is rotated. It is to be noted that, during passage from right-to-left through the pair of elements 606–608, the polarization plane orientation of linearly polarized light is rotated by 90°, but, during passage from left-to-right through the pair of elements 606–608, the polarization plane orientation is not rotated.

Figure 7A:
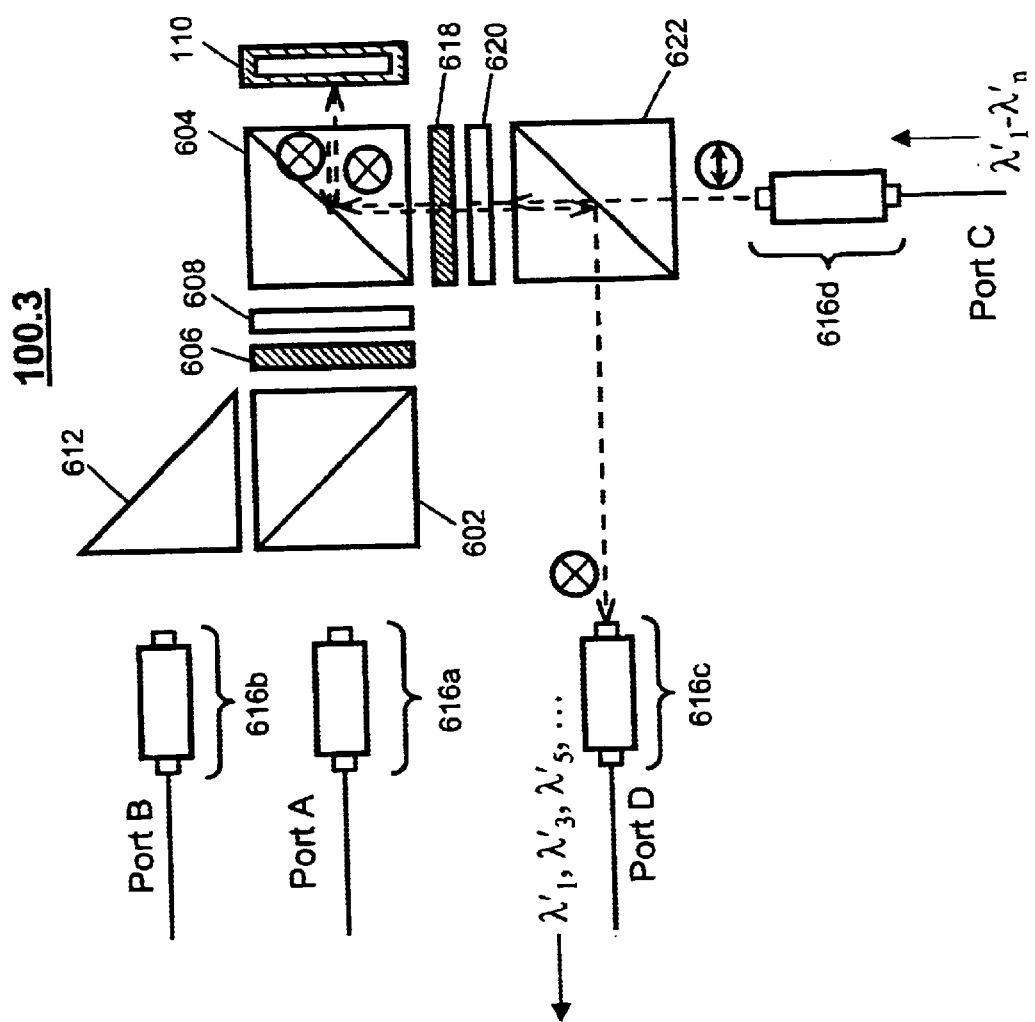
FIGS. 7a–7b are side views of a fourth preferred embodiment of the switchable interleaved channel separator device in accordance with the present invention.
Figure 7B:
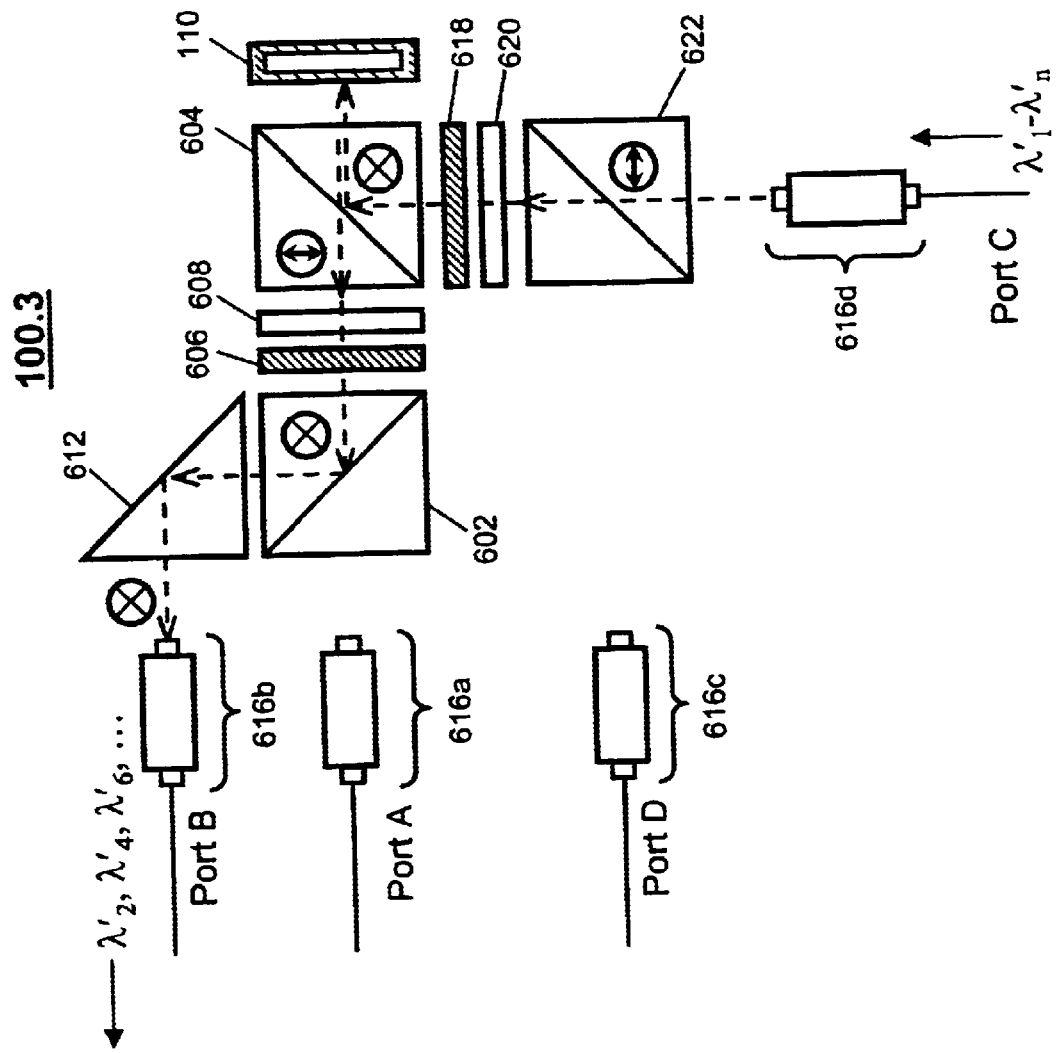

FIGS. 7a–7b are side views of a fourth preferred embodiment of the switchable interleaved channel separator device in accordance with the present invention. In the switchable interleaved channel separator device 100.3 (FIGS. 7a–7b), the three ports 616a–616c, first PBS 602, non-reciprocal optical rotator 606, reciprocal optical rotator 608, second PBS 604, adjustable non-linear interferometer 110 and optical reflector 612 are common to and disposed similarly to the respective similarly numbered components in the device 150.1 (FIGS. 6a–6c). However, in the 2×2 switchable interleaved channel separator device 100.3 (FIGS. 7a–7b), a third PBS 622 replaces the optical reflector 614, an additional input port 616d is optically coupled to and disposed adjacent to a face of the third PBS 622 and an additional non-reciprocal optical rotator 618 and reciprocal optical rotator 620 are disposed between the third PBS 622 and the second PBS 604.

Details of the operation of the 2×2 switchable interleaved channel separator device 100.3 are provided in the aforementioned co-pending U.S. Patent Application having Ser. No. 09/630,891. The functionality of the 2×2 switchable interleaved channel separator device 100.3 (FIGS. 7a–7b) with respect to a plurality of channels $\lambda_1$–$\lambda_n$ input to the device 100.3 from input port 616a is similar to that of the 1×2 switchable interleaved channel separator device 150.1 (FIGS. 6a–6c). However, the 2×2 switchable interleaved channel separator device 100.3 comprises additional functionality beyond that of the 1×2 switchable interleaved channel separator device 150.1 with respect to the routing of a plurality of channels $\lambda'_1$–$\lambda'_n$ that are input to the device 100.3 from the second input port 616d. FIGS. 7a and 7b respectively illustrate the pathways of the odd channels $\lambda'_1$, $\lambda'_3$, $\lambda'_5$ . . . and of the even channels $\lambda'_2$, $\lambda'_4$, $\lambda'_6$, . . . from the input port 616d through the device 100.3 when the device 100.3 is in its state "0". By following the pathways and polarization states of the signal light input from port 616d as shown in FIGS. 7a and 7b, it may be verified that, in the state "0", the device 100.3 functions as shown in the upper diagram of FIG. 1a. The pathways of the odd channels and the even channels may be interchanged by toggling the adjustable non-linear interferometer 110 from one state to another as described in greater detail below.

Figure 8A:
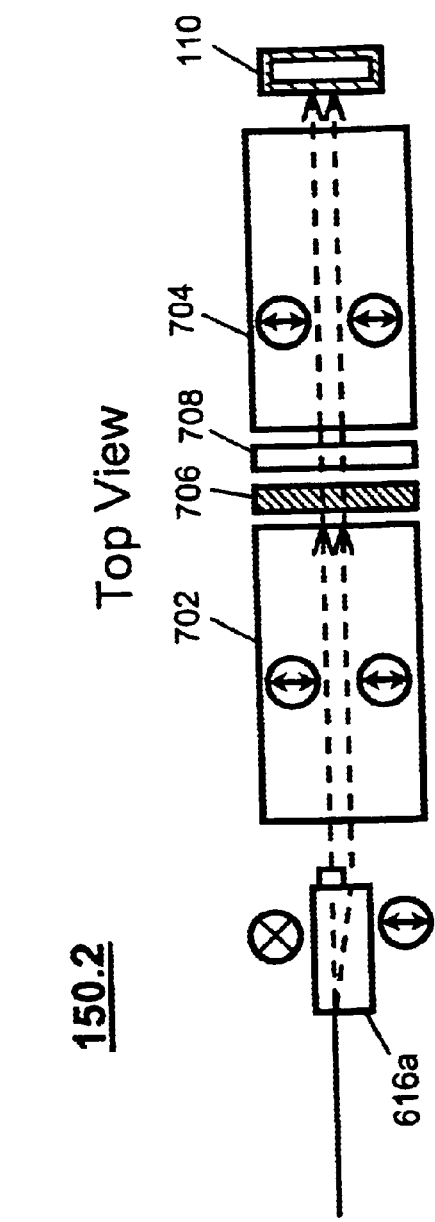
FIGS. 8a–8c are each a top view and a side view of a fifth preferred embodiment of the switchable interleaved channel separator device in accordance with the present invention.
Figure 8A:
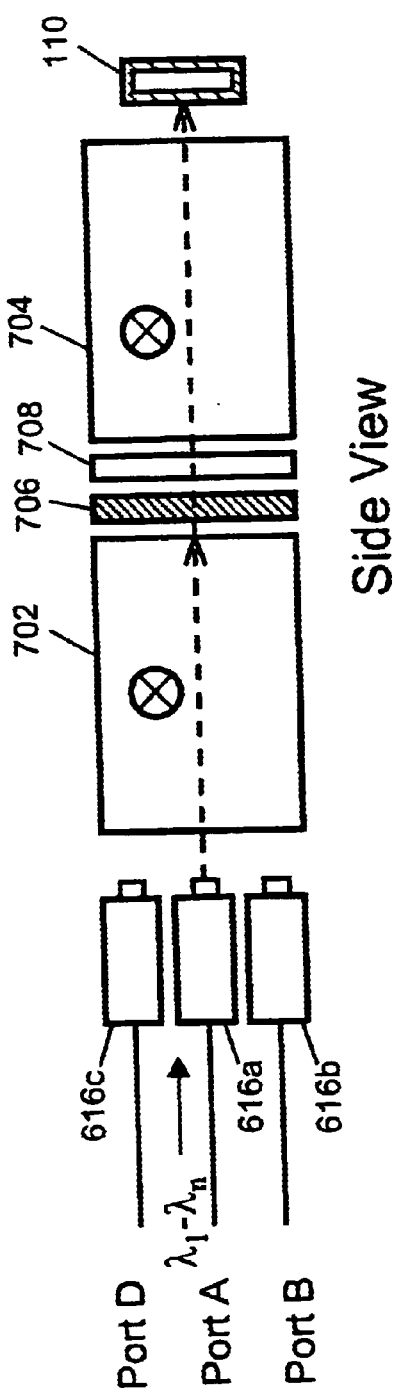
Figure 8B:
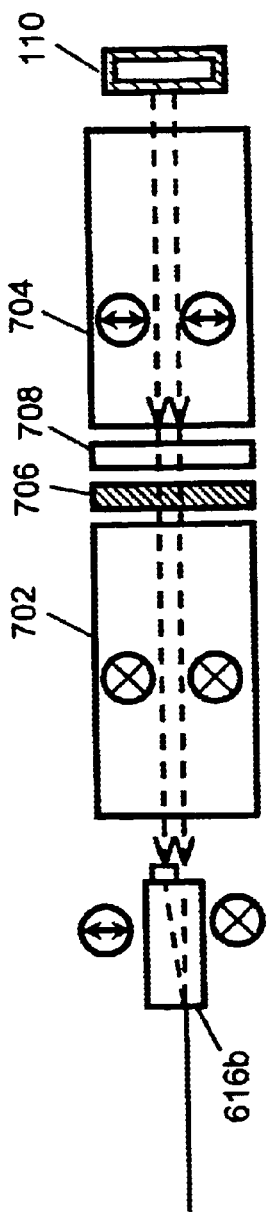
Figure 8B:
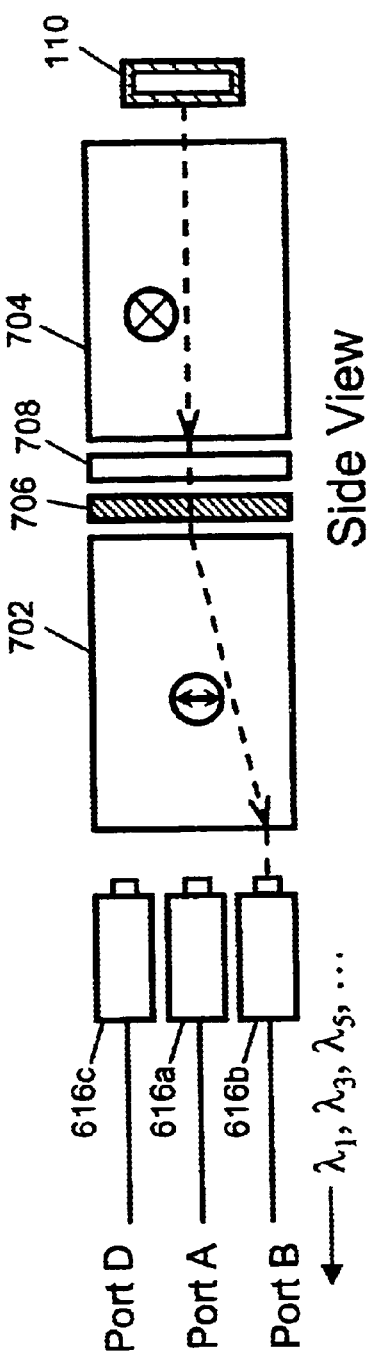
Figure 8C:
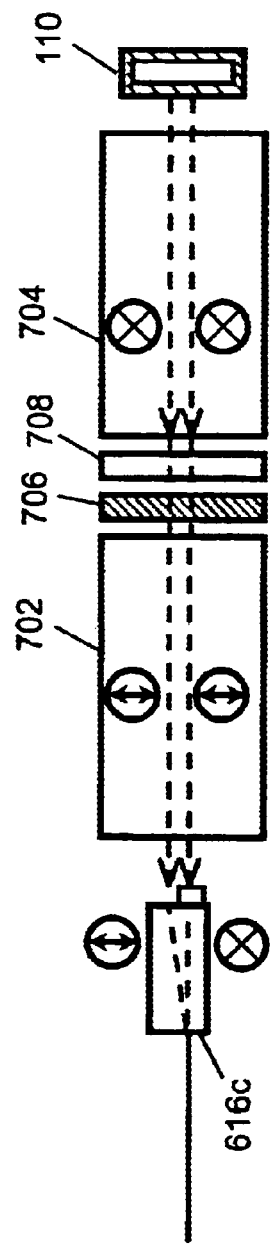
Figure 8C:
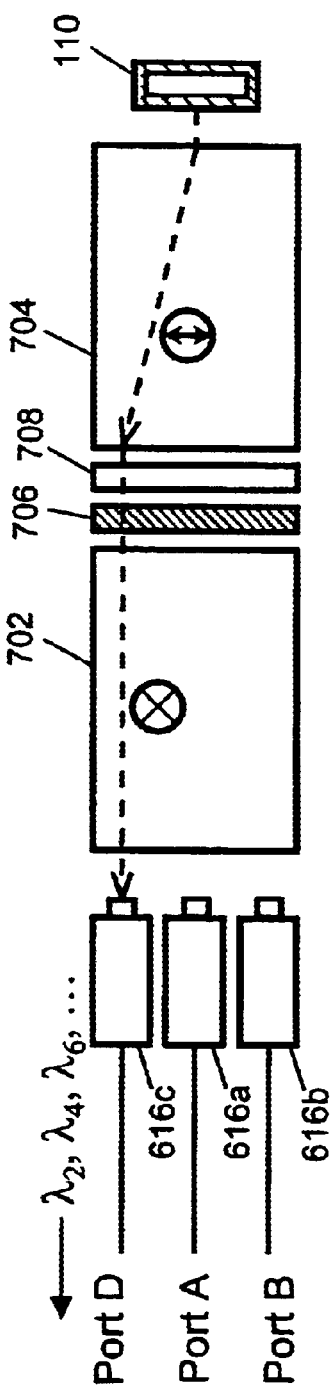

FIGS. 8a–8c are side views and top views of a fifth preferred embodiment of the switchable interleaved channel separator device in accordance with the present invention. The 1×2 switchable interleaved channel separator device 150.2, shown in FIGS. 8a–8c, is a modified version of an apparatus disclosed in U.S. Pat. No. 6,396,629. Applicant incorporates this patent application herein by reference in its entirety. Like the device 150.1 previously described (FIGS. 6a–6c), the 1×2 switchable interleaved channel separator device 150.2 (FIGS. 8a–8c) receives input from a first optical port 616a and separates the channels therein into a first set of channels and a second set of channels that are interleaved with the first set of channels, wherein the first set is output to a first output optical port 616b and the second set is output to a second output optical port 616c, respectively.

As shown in FIG. 8a, the switchable interleaved channel separator device 150.2 comprises a first 702 and a second 704 birefringent walk-off plate (or, simply termed, "birefringent plate") between which are disposed a non-reciprocal optical rotator 706 and a reciprocal optical rotator 708. The first birefringent plate 702 receives optical input from the input port 616a which is disposed adjacent to a side of the birefringent plate 702 opposite to the non-reciprocal rotator 706 and reciprocal rotator 708. An adjustable non-linear interferometer 110 is disposed adjacent to the second birefringent plate 704 at a side opposite to the non-reciprocal rotator 706 and reciprocal rotator 708. Finally, the first output port 616b and the second output port 616c are disposed to either side of the input port 616a, wherein all three ports 616a–161c face the same side of the first birefringent plate 702. All three ports 616a–616c are polarizing ports of the type illustrated in FIG. 6d. The input port 616a, first birefringent plate 702, second birefringent plate 704, non-reciprocal rotator 706, reciprocal rotator 708 and non-linear interferometer 110 are disposed along a line which defines a main axis or dimension of the switchable interleaved channel separator device 150.2.

The two birefringent plates 702–704 (FIG. 8a) each have the property of transmitting signal light comprising a first polarization (o-ray) therethrough substantially parallel to the main axis whilst simultaneously causing a deflection or offset of a signal light comprising a second polarization (e-ray). The path of the e-ray is deflected within either birefringent plate 702–704 but is substantially parallel to (thereby offset from) that of the o-ray immediately upon exiting the plate. The optical axes of the two birefringent plates 702–704 are disposed such that, for e-rays passing through both such birefringent plates 702–704 in a same direction, the offset of the e-ray immediately caused by passage through the second such birefringent plate 704 is equal and opposite to the offset of the e-ray immediately caused by the passage through the first birefringent plate 702. As oriented in FIGS. 8a–8c, the e-rays and o-rays are polarized vertically and horizontally, respectively, during their traverses through the birefringent plates 702–704.

Explicit details of the operation of the switchable interleaved channel separator device 150.2 are provided in the aforementioned U.S. Pat. No. 6,396,629. In summary, light of a composite optical signal, which is comprised of a plurality of wavelength division multiplexed channels $\lambda_1$–$\lambda_n$, is input to the device 150.2 from input port 616a with a single linear polarization orientation and propagates through the device 150.2 to the adjustable non-linear interferometer 110 (FIG. 8a). The adjustable non-linear interferometer 110 reflects the signal light such that the polarization plane of one set of channels is rotated by 90° whilst that of a second set of channels interleaved with the first set is not rotated. Further, the adjustable non-linear interferometer 110 can operate in either one of two states so as to select the particular set of channels whose light incurs polarization rotation. The light of the reflected channels then returns through the device 150.2 such that the light comprising the various channels is separated according to its polarization orientation by the birefringent plates 702–704.

The polarization orientations and pathways of the channels through the device 150.2 may be traced out using FIGS. 8a–8c. In these figures, it is assumed that the polarization plane of light comprising the even channels is rotated. It is to be noted that, during passage from right-to-left through the pair of elements 706–708, the polarization plane orientation of linearly polarized light is rotated by 90°, but, during passage from left-to-right through the pair of elements 706–708, the polarization plane orientation is not rotated.

Figure 9A:
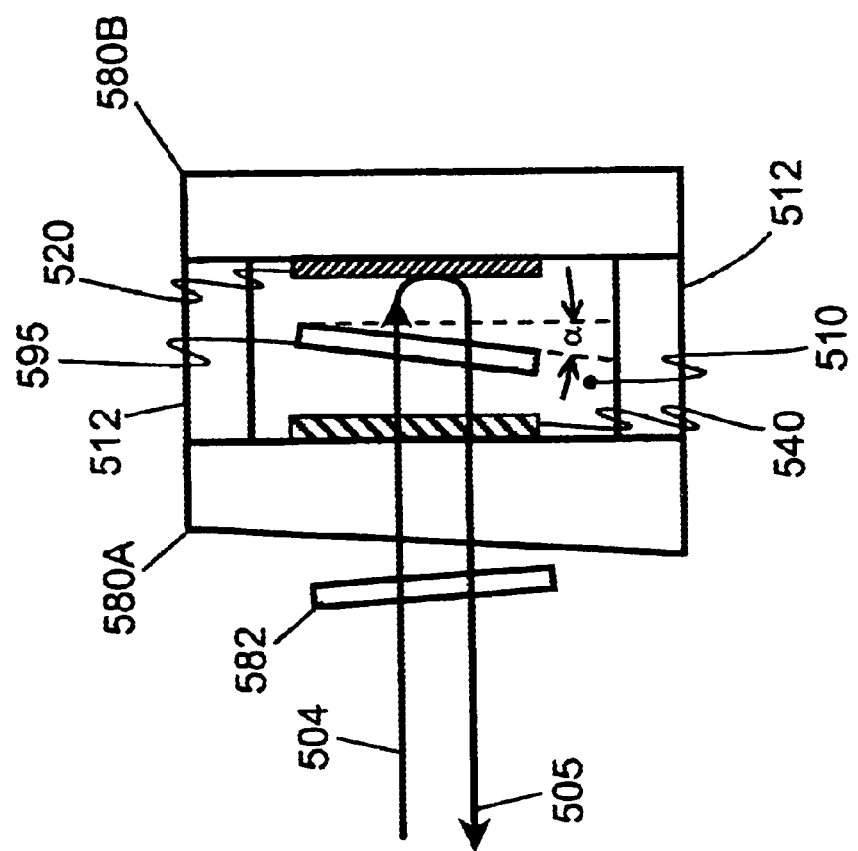
FIGS. 9a–9c are illustrations of three preferred embodiments of an adjustable nonlinear interferometer that may be utilized in the switchable interleaved channel separator device in accordance with the present invention.
Figure 9B:
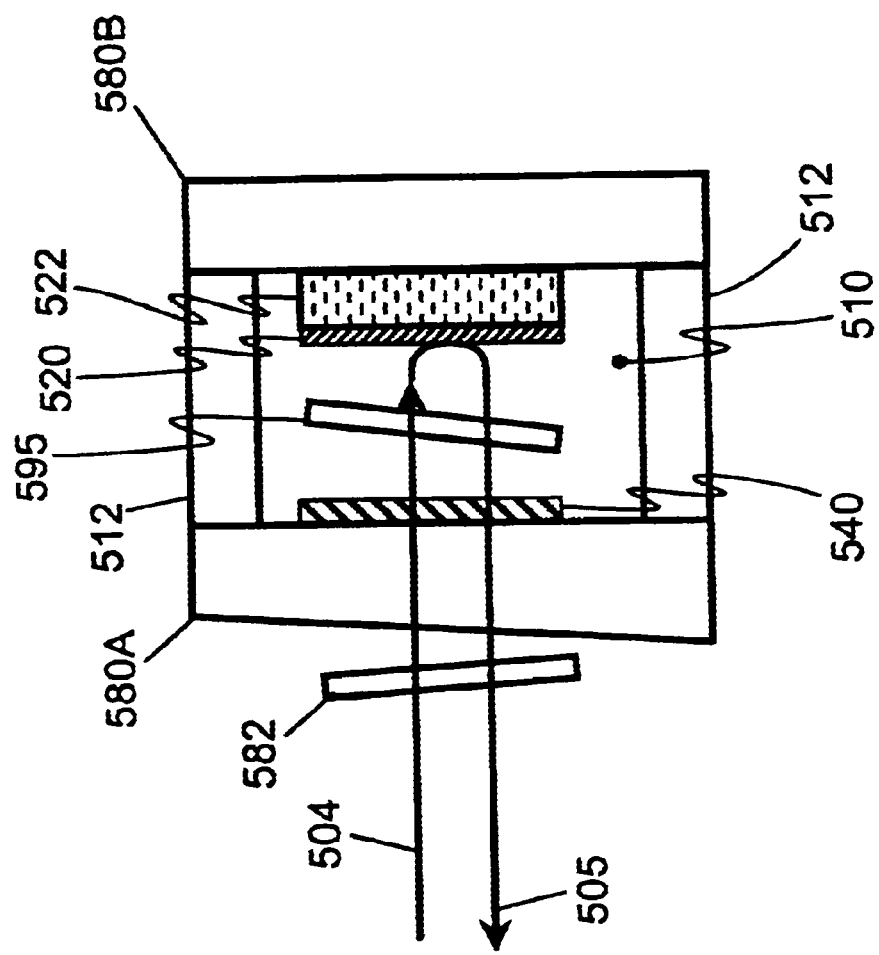
Figure 9C:
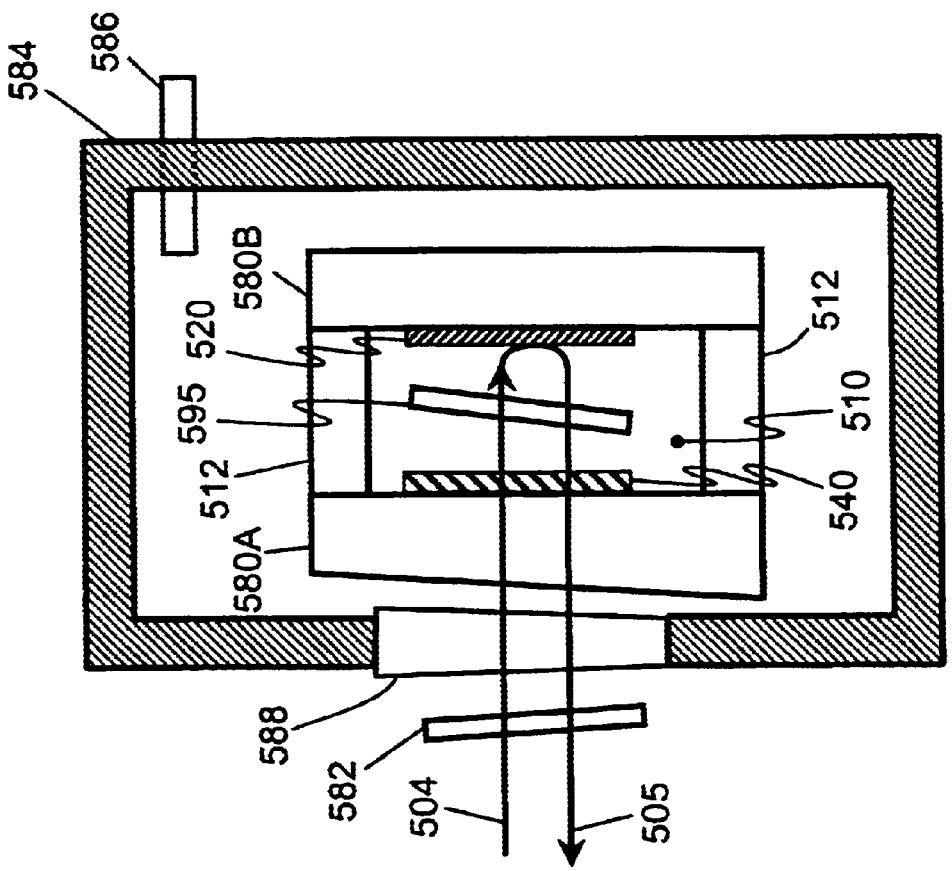

FIGS. 9a–9c illustrate three preferred embodiments of an adjustable non-linear interferometer 110 as utilized in the switchable interleaved channel separator device in accordance with the present invention. The non-linear interferometers 110.1 (FIG. 9a) 110.2 (FIG. 9b) and 110.3 (FIG. 9c) are modifications of an invention disclosed in the co-pending U.S. Pat. Nos. 6,169,604 and 6,310,690.

The adjustable non-linear interferometer 110.1 (FIG. 9a) comprises two glass plates 580A–580B optically coupled to one another, wherein the first glass plate 580A comprises a wedge shape. The inside face of the second glass plate 580B is coated with a layer of reflective coating 520 with a reflectivity preferably of 100%. The inside face of the first glass plate 580A is substantially parallel to the inside face of plate 580B and is coated with a layer of a partially reflective coating 540 with a reflectivity less than 100%. The two glass plates are separated by spacers 512, such that an interferometric cavity 510 is created between the partially reflective coating 540 and the 100% reflective coating 520. The spacers 512 preferably comprise a zero-thermal-expansion or low-thermal-expansion material. The adjustable non-linear interferometer 110.1 further comprises a first birefringent waveplate 582 disposed external to the cavity 510 and optically coupled to the glass plate 580A and a second birefringent waveplate 595 disposed within the cavity 510 and optically coupled to the glass plates 580A–580B. An input linearly polarized light 504 comprised of multiple channels is reflected as light 505, wherein the polarization of a first set of channels is rotated and the polarization of a second set of channels interleaved with the first set of channels is not rotated.

As described in more detail in the aforementioned co-pending U.S. Patent, the reflectivity, $r_1$, of the partially reflective coating 540 and the optical retardance (or retardation), $L_1$, of the external waveplate 582 and the optical retardance, $L_2$, of the internal waveplate 595, may be independently varied so as to vary the optical properties of the non-linear interferometer. Specifically, when $L_1=\lambda/8$, $L_2=\lambda/4$ and $r_1=18.5\%$, then the channels of the set comprising the rotated polarization light and channels of the set comprising the non-rotated polarization light have similar spectral bandwidths. In another example, when $L_1=7\lambda/32$, $L_2=\lambda/8$ and $r_1=32.5\%$, then the channels of the set comprising the rotated polarization light and the channels of the set comprising the non-rotated polarization light have spectral bandwidths that are in a ratio of 3:1 (or 1:3). In yet another example, when $L_1=7\lambda/32$, $L_2=\lambda/16$ and $r_1=56.3\%$, then the channels of the set comprising the rotated polarization light and the channels of the set comprising the non-rotated polarization light have spectral bandwidths that are in a ratio of 7:1 (or 1:7). In each case the first and second sets of channels are interleaved with one another.

Each of the adjustable non-linear interferometers 110.1–110.3 (FIGS. 9a–9c) may be changed from a first operational state to a second operational state by adjusting the optical path length $L_0$ of the cavity 510. In a first operational state, upon reflection from the adjustable non-linear interferometer 110.1–110.3, the polarization of the light of a first set of channels is rotated by 90° whilst the polarization of the light of a second set of channels is not rotated. In a second operational state, the polarization of the light of the second set of channels is rotated by 90° whilst the polarization of the light of the first set of channels is not rotated.

The principle that permits the change of operational states of the adjustable nonlinear interferometers 110.1–110.3 is illustrated in FIG. 9d, which presents two schematic graphs of the spectrum 320 of passbands of the polarization-rotated light and the spectrum 322 of passbands of non-polarization-rotated light. The upper and lower graphs of FIG. 9d represent the spectra of passbands reflected from an adjustable non-linear interferometer in a first operational state "0" and in a second operational state "1", respectively. The locations of "odd" channels 324 and of "even" channels 326 are also shown in the graphs of FIG. 9d. As is well known, the free spectral range (in terms of frequency) of a reflective interferometer of the type shown in FIGS. 9a–9c is inversely proportional to the optical path length Lo, of the cavity 510. Thus, when this optical path length is increased or decreased, the spectra 320–322 of passbands effectively "shift" to either the left or the right accordingly. A very slight change in the passband widths also accompanies this shift, but this effect is negligible in regards to the operation of any of the adjustable non-linear interferometers 110.1–110.3. The effect of the shift of the spectra of passbands is to cause the spectrum of polarization rotated light (non-polarization-rotated light) to either coincide with the locations of the even channels or the odd channels (odd channels or the even channels), depending upon the selected operational state, as may be seen be comparing the two graphs of FIG. 9d.

Within the adjustable non-linear interferometer 110.1 (FIG. 9a), the internal birefringent waveplate 595 is disposed within the cavity 510 at a certain "tilt" angle α with respect to the parallel reflective surfaces 520 and 540. The optical path length $L_0$ between the parallel reflective surfaces 520 and 540 depends, in part, on the optical path length $L_{595}$ through the optical length adjustment element. This quantity $L_{595}$ is, in turn, related to the physical path length of signals 504–505 through the element 595 as well as the principal refractive indices of element 595. Since, this physical path length depends upon the tilt angle α of element 595, then it follows that the quantity $L_{595}$ and the quantity $L_0$ depend upon the angle α. Thus, by adjusting the angle α, it is possible to tune the phase of the channels comprising the reflected light 505. The angle α may be adjusted by means of a mechanical tilt adjustment mechanism (not shown) so that the phase of the reflected channels may be varied during operation of the switchable interleaved channel separator device within which the adjustable non-linear interferometer is utilized. These phase changes cause the shifts of the passband spectra 320–322 (FIG. 9d).

The adjustable non-linear interferometer 110.2 shown in FIG. 9b comprises all the elements ("cavity elements") of the interferometer 110.1 (FIG. 9a) in addition to a piezoelectric element 522 attached to the second glass plate 580B. Instead of being disposed on the second glass plate 580B, the 100% reflective coating comprising the adjustable non-linear interferometer 110.2 is disposed upon the piezoelectric element 522 facing into the cavity 510 (FIG. 9b). By controlling a voltage applied across the piezoelectric element 522, the variable thickness t of the piezoelectric element 522 may be very accurately controlled. This property of piezoelectric materials is well known. In this fashion, the optical path length $L_0$ between the parallel reflective surfaces 520 and 540 may be controlled. Thus, by adjusting the thickness t, it is possible to control the phase of the reflected channels 505. The internal waveplate 595 is disposed in a fixed position—that is, without a tilt adjustment—within the adjustable non-linear interferometer 110.2.

The adjustable non-linear interferometer 110.3 shown in FIG. 9c comprises all the elements of the interferometer 110.1 (FIG. 9a). However, in the adjustable non-linear interferometer 110.3, the "cavity elements" are disposed within a hermetically sealed enclosure 584. Preferably, the external waveplate 582 is disposed outside of the enclosure 584, but could also be within the enclosure. A window 588 comprising non-parallel surfaces is bonded to the enclosure and permits the previously described optical couplings to be maintained. In operation, a positive air pressure is maintained within the enclosure 584. The exact pressure within the enclosure 584 may be varied by forcing gas into or extracting gas from the enclosure via the inlet tube 586. These controlled variations in gas pressure within the enclosure cause slight expansions or contractions of the interferometer elements within the enclosure such that the optical path length between the two reflective surfaces 520 and 540 may be varied in a controlled fashion. The variation of optical path length is sufficient to vary the phase of the reflected channels 505. The internal waveplate 595 is disposed in a fixed position—that is, without a tilt adjustment—within the adjustable nonlinear interferometer 110.3.

Figure 10:
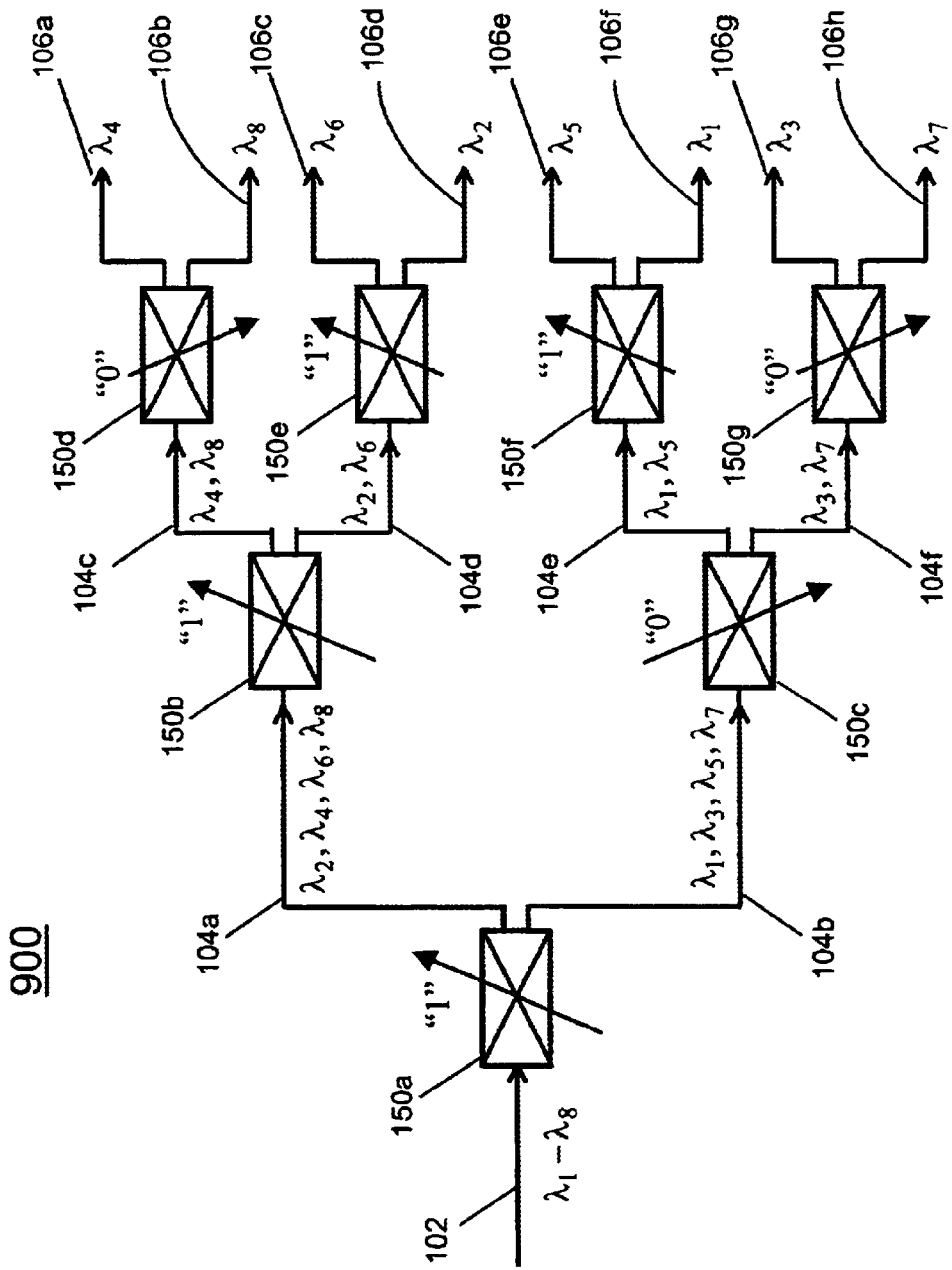
FIG. 10 is an illustration of a first preferred embodiment of an optical communications system that utilizes the switchable interleaved channel separator device in accordance with the present invention.

FIG. 10 is an illustration of a first preferred embodiment of an optical communications system that utilizes the switchable interleaved channel separator device in accordance with the present invention. This dense wavelength division multiplexing (DWDM) system 900 comprises a plurality of switchable interleaved channel separator devices (150a, 150b, 150c . . . ), each of which functions as a 1×2 switch as illustrated in FIG. 1b. The DWDM system 900 has a programmable parallel cascade router configuration, since each of the switchable interleaved channel separator devices (150a, 150b, 150c, . . . ) may be programmed to route particular channels to particular paths. This programmable parallel cascade router configuration is disclosed in a co-pending U.S. Pat. No. 6,263,126 assigned to the assignee of the present application. Applicant incorporates this patent application herein by reference in its entirety.

The DWDM 900 comprises an optical input 102, a plurality of switchable interleaved channel separator devices 150a, 150b, 150c, . . . optically coupled in a parallel cascade configuration by a plurality of optical couplings 104a, 104b, 104c, . . . and a plurality of optical outputs 106a, 106b, 106c, . . . , wherein the input 102 carries a wavelength division multiplexed composite optical signal and each output carries an individual signal or channel. Generally the optical input, the optical outputs and the optical couplings will all comprise optical fibers, but may comprise, in whole or in part, any form of optical coupling devices, such as lenses, mirrors, prisms, windows, etc. For clarity, it is assumed that the input composite optical signal to the DWDM 900 comprises the eight channels $\lambda_1$–$\lambda_8$ and, thus, the eight optical outputs 106a–106h, the seven switchable interleaved channel separator devices 150a–150g and the six optical couplings 104a–104f are utilized. However, the input composite optical signal to the DWDM 900 may comprise any number of channels and the number of switchable interleaved channel separator devices, optical couplings and optical outputs-may vary accordingly.

The switchable interleaved channel separator devices 150a–150g of the DWDM 900 are arranged in a parallel cascade configuration such that: (1) the two outputs of the device 150a are optically coupled to the device 150b and the device 150c via the optical couplings 104a and 104b, respectively; (2) the two outputs of the device 150b are optically coupled to the device 150d and the device 150e via the optical couplings 104c and 104d, respectively; (3) the two outputs of the device 150c are optically coupled to the device 150f and the device 150g via the optical couplings 104e and 104f, respectively and (4) each of the devices 150d–150g is optically coupled to a pair of the optical outputs 106a–106h. The spacing between passbands of the devices 150b–150c is twice that of the passband spacing of device 150a. The passband spacing of the devices 150d–150g is twice that of the passband spacings of devices 150b–150c.

In the example illustrated in FIG. 10, the first switchable interleaved channel separator device 150a is in state "1" (see FIG. 1b) and thus routes the odd channels ($\lambda_1, \lambda_3, \lambda_5, \lambda_7$) to device 150c and the even channels ($\lambda_2, \lambda_4, \lambda_6, \lambda_8$) channels to the device 150b. Device 150b, also in state "1", routes $\lambda_4$ and $\lambda_8$ to device 150d, and routes $\lambda_2$ and $\lambda_6$ to device 150e. However, the device 150c is in state "0" (in this example) and thus routes channels $\lambda_3$ and $\lambda_7$ to device 150g, and routes $\lambda_1$ and $\lambda_5$ to device 150f. Similarly, the devices 150e and 150f are in the state "1" whereas the devices 150d and 150g are in the state "0", resulting in the particular set of outputs to ports 106a–106h as shown in FIG. 10. In the example shown in FIG. 10, there are seven different independent 1×2 devices 150a–150g which may be programmed independently of one another. There are therefore $2^7(=128)$ different possible permutations of the output signals among the outputs 106a–106h.

Figure 11:
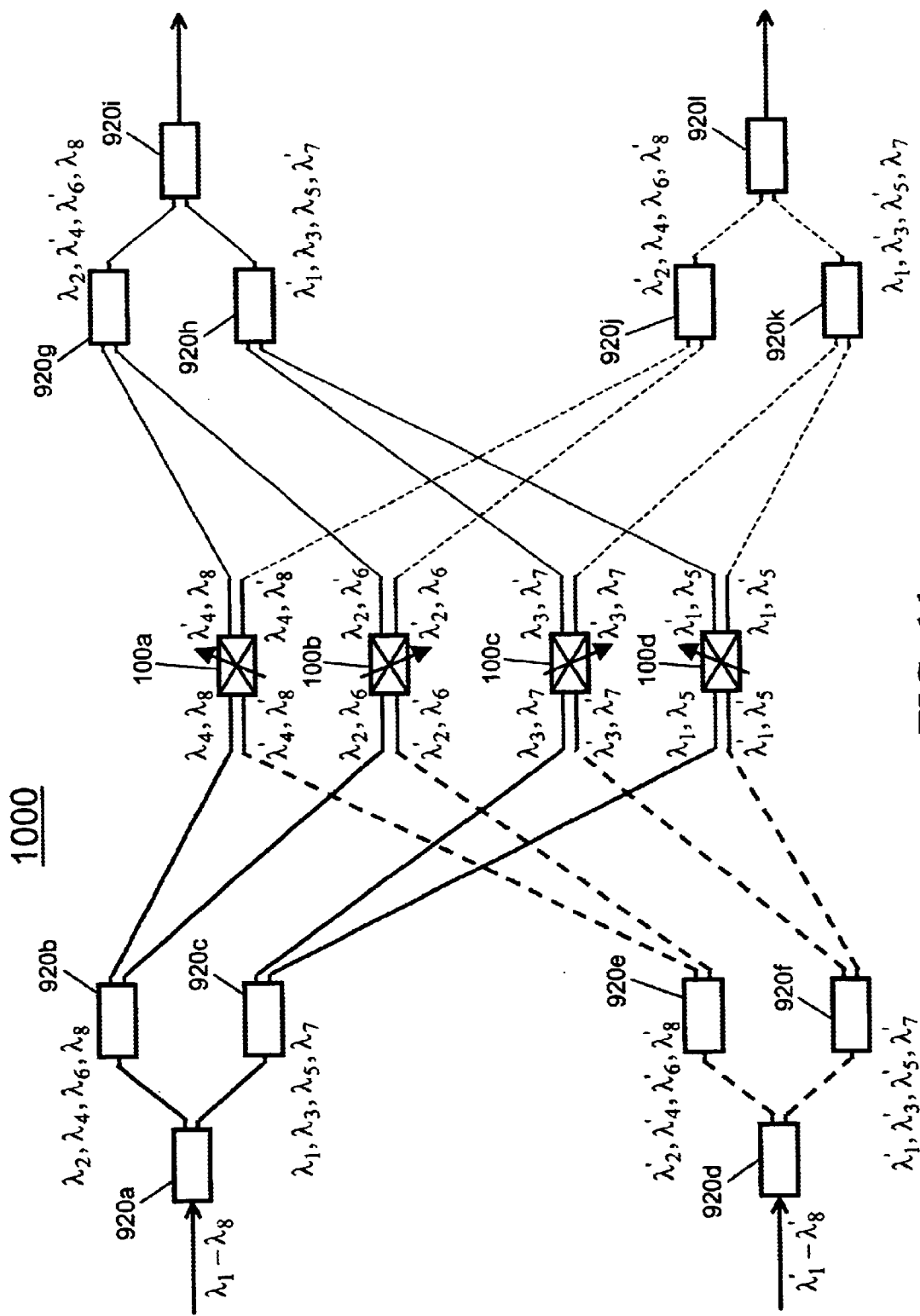
FIG. 11 is an illustration of a second preferred embodiment of an optical communications system that utilizes the switchable interleaved channel separator device in accordance with the present invention.

FIG. 11 illustrates a second preferred embodiment of an optical communications system that utilizes the switchable interleaved channel separator device in accordance with the present invention. The system 1000 (FIG. 11) comprises a plurality of switchable interleaved channel separator devices (100a, 1100b, 1001c, . . . ) each of which functions as a 2×2 switch as illustrated in FIG. 1a. In the example illustrated in FIG. 1, a first wavelength division multiplexed composite optical signal comprising the channels $\lambda_1$–$\lambda_8$ is input to the set of channel separators 920a–920c and a second wavelength division multiplexed composite optical signal comprising the channels $\lambda_1'$–$\lambda_8'$ is input to the set of channel separators 920d–920f. The set of channel separators 920a–920c and the set of channel separators 920d–920f are each configured in a parallel cascade arrangement as disclosed in the aforementioned co-pending U.S. Patent Application having Ser. No. 09/130,386. Therefore, the two outputs of the channel separator 920b comprise the set of channels ($\lambda_4, \lambda_8$) and the set of channels ($\lambda_2, \lambda_6$), respectively. The two outputs of the channel separator 920c comprise the set of channels ($\lambda_3, \lambda_7$) and the set of channels ($\lambda_1, \lambda_5$), respectively. Likewise, the two outputs of the channel separator 920e comprise the set of channels ($\lambda_4', \lambda_8'$) and the set of channels ($\lambda_2', \lambda_6'$), respectively and the two outputs of the channel separator 920f comprise the set of channels ($\lambda_3', \lambda_7'$) and the set of channels ($\lambda_1', \lambda_5'$), respectively.

Within the system 1000 (FIG. 11), the "4" and "8" channels, that is, the set of channels ($\lambda_4, \lambda_8$) and the set of channels ($\lambda_4', \lambda_8'$), are input to the 2×2 switchable interleaved channel separator device 100a. Likewise, the "2" and "6" channels from each original composite optical signal are input to the 2×2 switchable interleaved channel separator device 100b, the "3" and "7" channels are input to the 2×2 switchable interleaved channel separator device 100c and the "1" and "5" channels are input to the 2×2 switchable interleaved channel separator device 100d. Each of the 2×2 switchable interleaved channel separator devices 100a–100d may be in one of two different switch states, "0" or "1". One output of each of the devices 100a–100d is directed to the set of channel separators 920g–920i and the other output of each of the devices 100a–100d is directed to the set of channel separators 920j–920l. The switch state of each of the devices 100a–100d determines the particular routings of the wavelengths to the outputs, as described previously with reference to FIG. 1a. The set of channel separators 920g–920i and the set of channel separators 920j–920i are each configured in a parallel cascade arrangement so as to re-combine the various channels. For the particular set of switch states illustrated in FIG. 11, the channels $\lambda_1', \lambda_2, \lambda_3, \lambda_4', \lambda_5, \lambda_6', \lambda_7'$ and $\lambda_8$ are routed to as to be output from system 1000 via the channel separator 920i and the channels $\lambda_1, \lambda_2', \lambda_3', \lambda_4, \lambda_5', \lambda_6, \lambda_7$ and $\lambda_8'$ are routed so as to be output via channel separator 920l. For the example shown in FIG. 11, there are a total of sixteen different unique routing configurations of the system 1000.

Figure 12A:
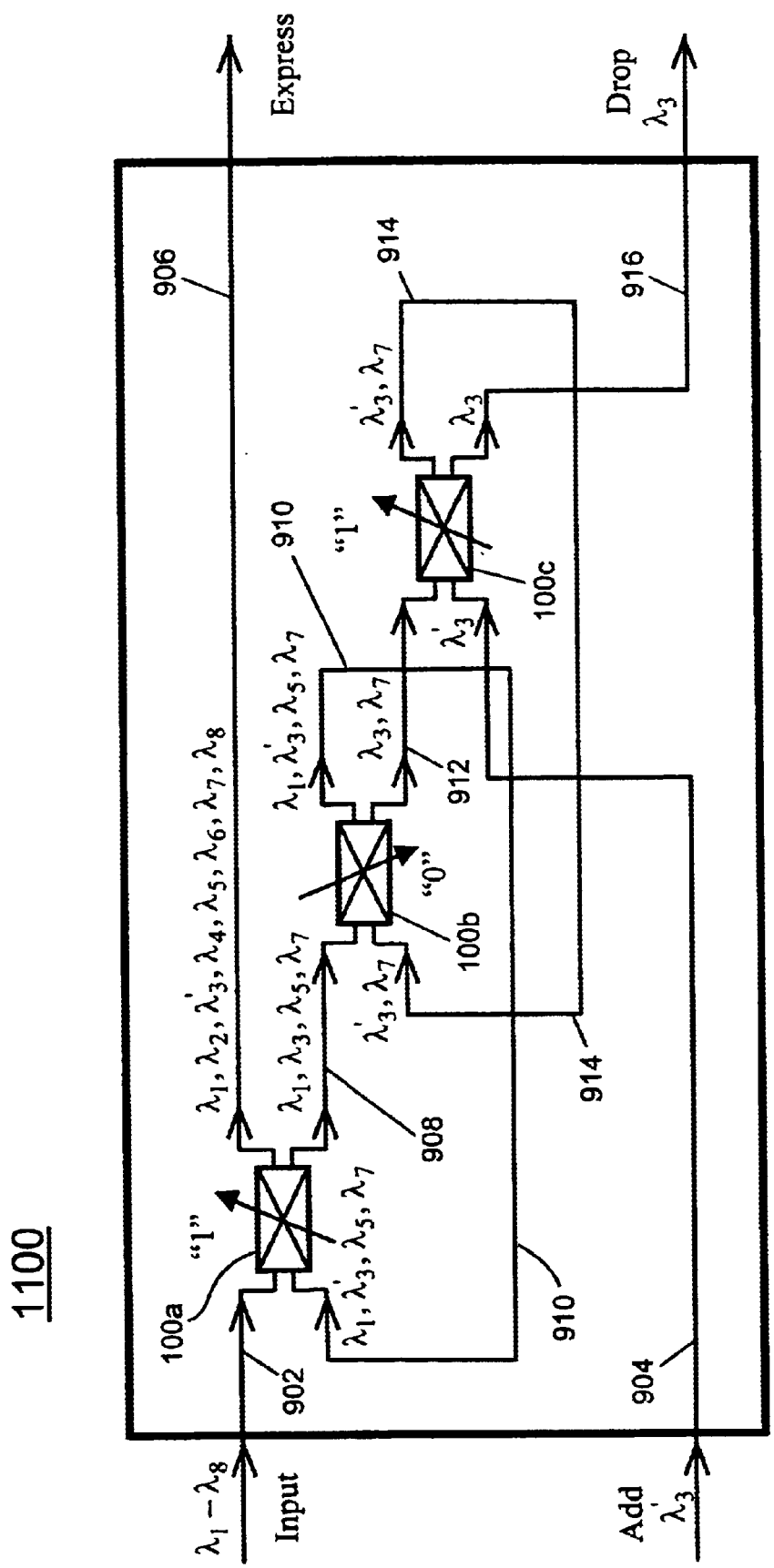
FIGS. 12a–12c are illustrations of a programmable optical add/drop multiplexer that utilizes the switchable interleaved channel separator device in accordance with the present invention.
Figure 12B:
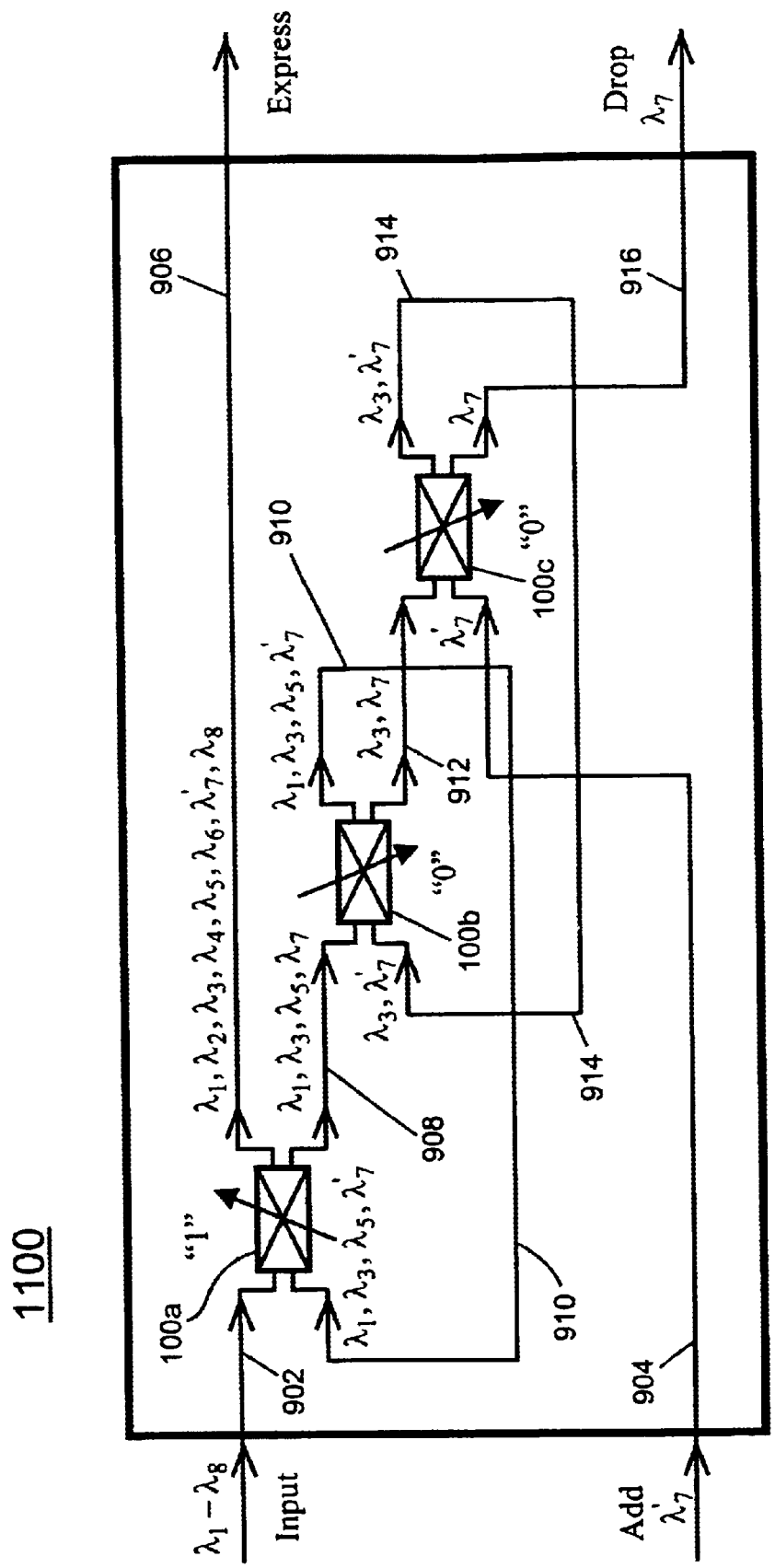
Figure 12C:
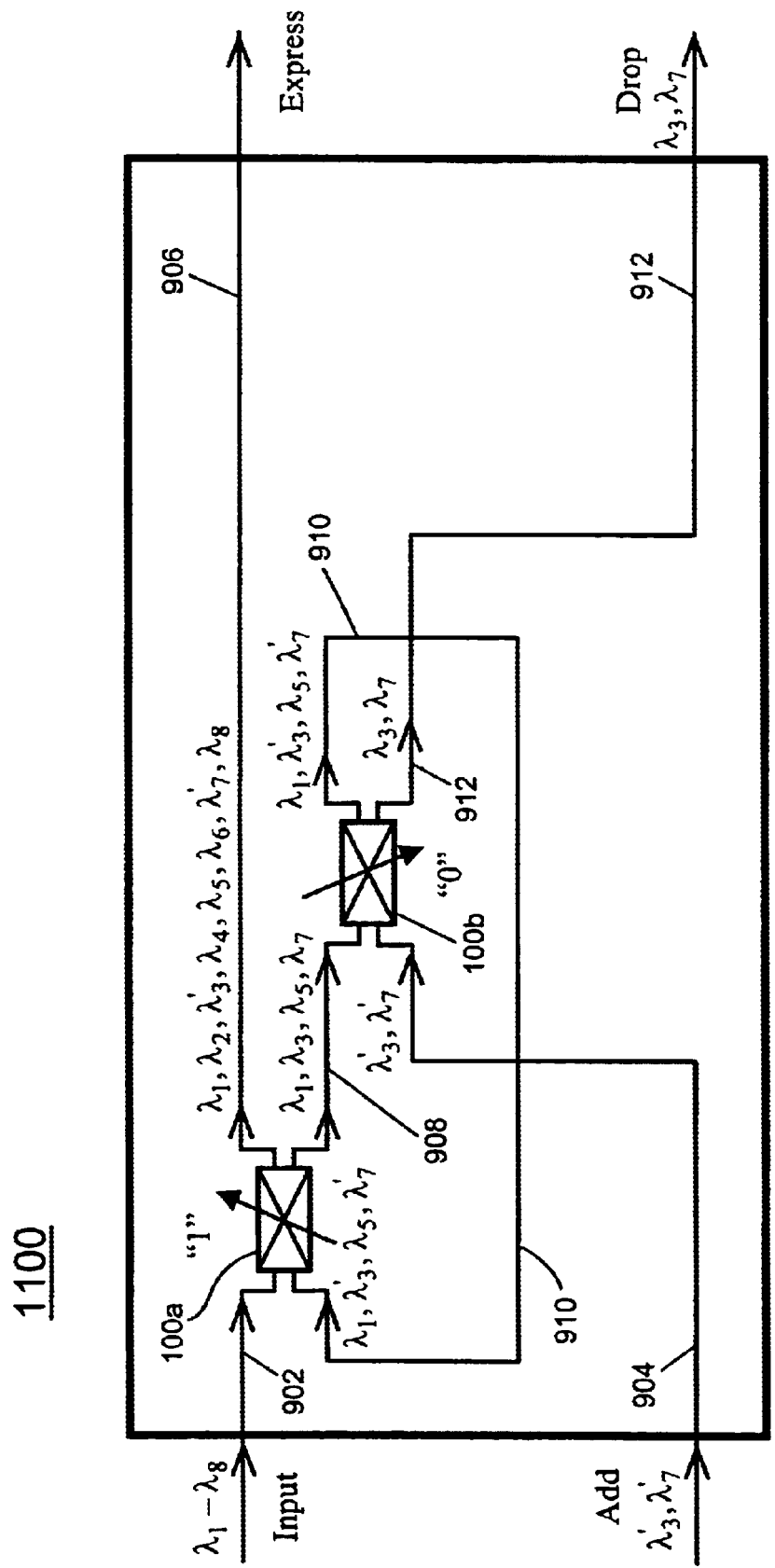

FIGS. 12a–12c illustrate a programmable optical add/drop multiplexer (OADM) that utilizes the switchable interleaved channel separator device in accordance with the present invention. The OADM 1100 (FIGS. 12a–12c) comprises a plurality of switchable interleaved channel separator devices (100a, 100b, 100c . . . ) each of which functions as a 2×2 switch as illustrated in FIG. 1a. FIGS. 12a–12b illustrate two different operational examples or states of the OADM 1100 wherein the OADM 1100 comprises three such switchable interleaved channel separator devices 100a–110c. FIG. 12c illustrates an example wherein the apparatus 1100 comprises two switchable interleaved channel separator devices 100a–100b. In each of the three operational examples shown in FIGS. 12a–12c, it is assumed that a composite optical signal comprising channels $\lambda_1$–$\lambda_8$ is input into the OADM 1100 via an optical input 902 and that the passband spacing of each switchable interleaved channel separator device is twice that of the immediately preceding device and one half of that of the immediately following device.

Referring now to the example shown in FIG. 12a, the first switchable interleaved channel separator device 100a separates the input composite optical signal into its odd ($\lambda_1, \lambda_3, \lambda_5, \lambda_7$) and even ($\lambda_2, \lambda_4, \lambda_6, \lambda_8$) channels. Since the device 100a is in a state "1" (in this example), the odd channels are directed, via optical coupling 908, to the device 100b, which separates them into two sets of channels, ($\lambda_1, \lambda_5$) and ($\lambda_3, \lambda_7$). Since the device 100b is in a state "0", the ($\lambda_3, \lambda_7$) set of channels is directed, via the optical coupling 912, to the device 100c which separates them into the separate channels $\lambda_3$ and $\lambda_7$. Since the device 100c is in a state "1", the channel $\lambda_3$ is then dropped to the drop line 916. Since the channel $\lambda_3$ is dropped, a new signal $\lambda_3'$ comprising the same wavelength as $\lambda_3$ may be simultaneously added as an input into the device 100c from the add line 904. Since the device 100c acts as a 2×2 switch and is in the state "1" as described previously, channel 3' is then added to $\lambda_7$ by the device 100c. This signal is looped back, via optical coupling 914, as an input to the device 100b, which, since it is in state "0", adds $\lambda_7$ and $\lambda_3'$ to $\lambda_1$ and $\lambda_5$. This combined signal is looped back, via optical coupling 910, as an input to the device 100a, which, since it is in state "1", adds channels $\lambda_1, \lambda_5, \lambda_7, \lambda_3'$ to channels $\lambda_2, \lambda_4, \lambda_6, \lambda_8$, resulting in one optical signal containing channels $\lambda_1, \lambda_2, \lambda_3', \lambda_4, \lambda_5, \lambda_6, \lambda_7$, and $\lambda_8$. This new signal is then output from the DWDM 1100 along the express line 906. Thus, in this manner, channel $\lambda_3$ is dropped while channel $\lambda_3'$ is added.

FIG. 12b illustrates an additional example of a different operational state of the OADM 1100. Since, in the examples of FIGS. 12a–12b, the OADM 1100 comprises three switchable interleaved channel separator devices 100a–100c, wherein each such device may be in one of two states, there are a total of $2^3(=8)$ possible operational states for the OADM 1100, each of which corresponds to adding and dropping of a different one of the eight possible wavelengths. It is to be noted, however, that the OADM 1100 may comprise any number of switchable interleaved channel separator devices and that the composite optical signal may comprise any number of channels. FIG. 12b illustrates the situation in which the three switchable interleaved channel separator devices 100a–100c are in the states "1", "0" and "0", respectively, and thus channel $\lambda_7$ is dropped and channel $\lambda_7'$ is added. More generally, for $2^n$ channels and m ($m \leq n$) stages, $2^{n-m}$ channels may be dropped. In the further example shown in FIG. 12c, the OADM 1100 comprises two stages (that is, m=2) and thus two channels may be simultaneously dropped and added.

Figure 13:
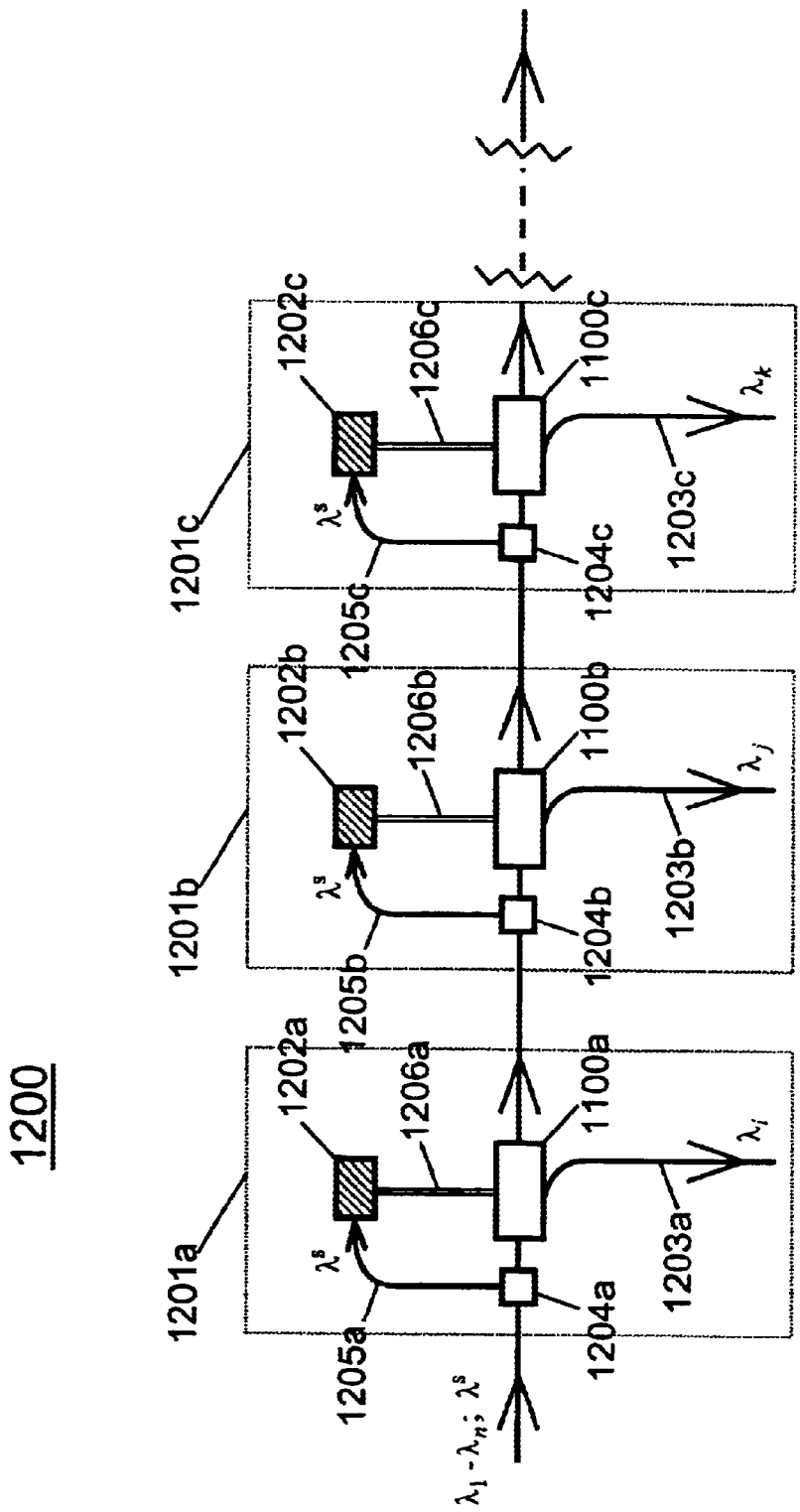
FIG. 13 is an illustration of an optical communications system that utilizes the programmable optical add/drop multiplexer of FIGS. 12a–12c.
Figure 14:
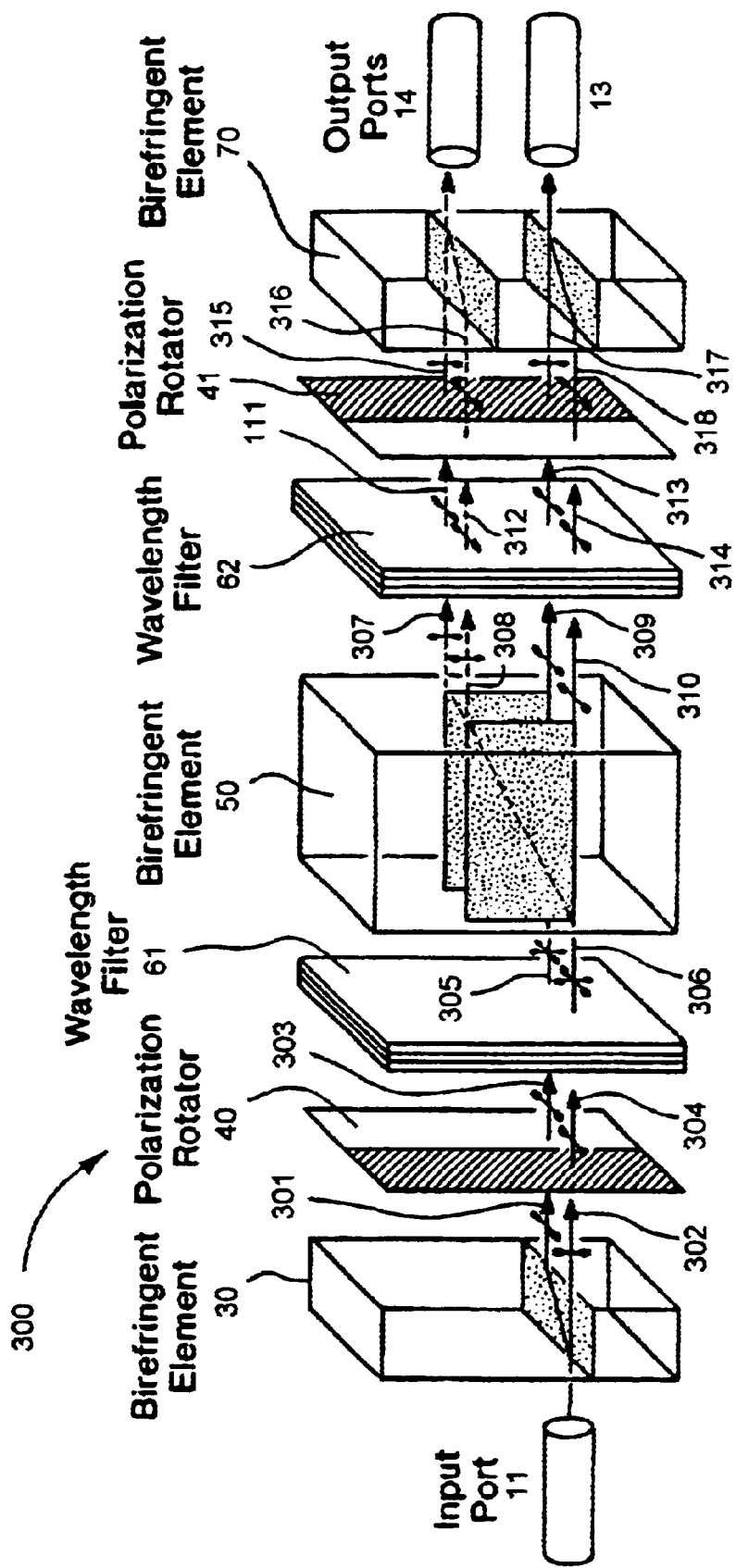
FIG. 14 is a diagram of a prior art switchable wavelength router.

FIG. 13 illustrates an optical communications system that utilizes the optical add/drop multiplexer of FIGS. 1a–12c. The system 1200 drops a different channel from a composite optical signal at each one of a series of nodes within an optical network. The nodes are represented by the reference numerals 1201a, 1201b, 1201c, . . . in the programmable optical communications system 1200 shown in FIG. 13. Each node comprises one of a plurality of programmable OADM's 1100a, 1100b, 1100c, . . . , one of a plurality of optical drop lines 1203a, 1203b, 1203c, . . . , one of a plurality of optical taps 1204a, 1204b, 1204c, . . . , one of a plurality of optical tap lines 1205a, 1205b, 1205c, . . . , one of a plurality of controllers 1202a, 1202b, 1202c, . . . , and one of a plurality of electronic control lines 1206a, 1206b, 1206c, . . . . Within each node 1201a, 1201b, 1201c, . . . comprising the system 1200, an optical tap line 1205a, 1205b, 1205c, . . . is optically coupled between an optical tap 1204a, 1204b, 1204c, . . . and a controller 1202a, 1202b, 1202c, . . . ; a programmable OADM 1100a, 1100b, 1100c, . . . is optically coupled to an optical drop line 1203a, 1203b, 1203c, . . . and to an optical tap and to at least one other node 1201a, 1201b, 1201c, . . . , and an electronic control line 1206a, 1206b, 1206c, . . . is electronically coupled between a controller 1202a, 1202b, 1202c, . . . and an OADM 1100a, 1100b, 1100c, . . . Preferably, each one of the programmable OADM's 1100a, 1100b, 1100c, . . . comprises the structure shown in FIGS. 12a–12b.

The first node 1201a in the programmable system 1200 receives a composite optical signal comprising the channels $\lambda_1$–$\lambda_n$ as well as an optical service channel $\lambda^s$ from the optical network. The optical service channel $\lambda^s$ comprises a wavelength that is different from those of any of the regular channels and carries information related to the routing of various channels within the programmable system 1200. This information is utilized and decoded by each of the controllers 1202a, 1202b, 1202c, . . . so that the appropriate channel is dropped to the drop line 1203a, 1203b, 1203c, . . . at each node 1201a, 1201b, 1201c, . . . . Within each node 1201a, 1201b, 1201c, . . . , the controller 1202a, 1202b, 1202c, . . . sends appropriate control signals to the programmable OADM 1100a, 1100b, 1100c, . . . through the electronic control line 1206a, 1206b, 1206c, . . . . The control signals cause the set of switchable interleaved channel separator devices comprising the programmable OADM 1100a, 1100b, 1100c, . . . to assume the appropriate switch states such that the correct wavelength channel is dropped at each node. In this system 1200, no signals are added at the nodes 1201a, 1201b, 1201c, . . . . Therefore, upon exiting from each node, the composite optical signal that propagates to the subsequent node comprises one less channel than that entering the node.

An improved switchable interleaved channel separator device, and methods and systems utilizing the device in fiber optic communications networks, have been disclosed. The switchable interleaved channel separator device utilizes an adjustable reflective non-linear interferometer, which performs both switching and wavelength polarization sorting functions, so that overall complexity of the device is reduced. Further, because the adjustable non-linear interferometer is a reflection element, signal light paths are folded back upon one another so as to realize an overall reduction in the device's size, as well as the capability of performing optical couplings predominantly or wholly at a single side or at adjacent sides of the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A switchable interleaved channel separator device, comprising:

at least one input port for inputting at least one optical signal in a forward direction;

a separating means optically coupled to the at least one input port for separating the at least one optical signal traversing through the separating means in a return direction into a first set of channels and a second set of channels interleaved with the first set of channels, wherein the separating means comprises:

a first polarization beam splitter (PBS) optically coupled to the at least one input port, a set of optical rotators optically coupled to the first PBS at a face intersecting a main axis of the device, the set of optical rotators comprising a non-reciprocal optical rotator (NRR) and a reciprocal optical rotator (RR), a second PBS optically coupled to the set of optical rotators at a side opposite to the first PBS, wherein the at least one ANLI is optically coupled to the second PBS at a side opposite to the set of optical rotators, a first optical reflector optically coupled to a face of the first PBS not intersecting the main axis and optically coupled to the first output port, and a second optical reflector optically coupled to a face of the second PBS not intersecting the main axis and optically coupled to a second output port;

at least one adjustable non-linear interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second sets of channels to the separating means in the return direction;

a first output port optically coupled to the separating means for outputting the first set of channels when the at least one ANLI is in the first state and the second set of channels when the at least one ANLI is in the second state; and the second output port optically coupled to the separating means for outputting the second set of channels when the at least one ANLI is in the first state and the first set of channels when the at least one ANLI is in the second state.

2. The device of claim 1, wherein the at least one input port comprises:
   an optical collimator;
   a birefringent walk-off plate optically coupled to the optical collimator; and
   an input reciprocal optical rotator intercepting a portion of a light from the birefringent walk-off plate.

3. A switchable interleaved channel separator device, comprising:
   at least one input port for inputting at least one optical signal in a forward direction;
   a separating means optically coupled to the at least one input port for separating the at least one optical signal traversing through the separating means in a return direction into a first set of channels and a second set of channels interleaved with the first set of channels;
   at least one adjustable non-linear interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second sets of channels to the separating means in the return direction, wherein the at least one ANLI comprises:
      a first glass plate optically coupled to a second plate, forming a cavity therebetween,
      a first reflective coating with a first reflectivity residing inside the cavity and on the first glass plate,
      a piezoelectric element residing inside the cavity and coupled to the second plate, wherein a thickness of the piezoelectric element is adjustable, wherein the thickness determines whether the at least one ANLI is in the first state or the second state,
      a second reflective coating with a second reflectivity residing inside the cavity and on the piezoelectric element,
      a first waveplate with a first optical retardance residing outside the cavity and optically coupled to the first glass plate, and
      a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels;
   a first output port optically coupled to the separating means for outputting the first set of channels when the at least one ANLI is in the first state and the second set of channels when the at least one ANLI is in the second state; and
   a second output port optically coupled to the separating means for outputting the second set of channels when the at least one ANLI is in the first state and the first set of channels when the at least one ANLI is in the second state.

4. A switchable interleaved channel separator device, comprising:
   at least one input port for inputting at least one optical signal in a forward direction;
   a separating means optically coupled to the at least one input port for separating the at least one optical signal traversing through the separating means in a return direction into a first set of channels and a second set of channels interleaved with the first set of channels, wherein the separating means comprises:
      a first polarization beam splitter (PBS) optically coupled to the at least one input port,
      a set of optical rotators optically coupled to the first PBS at a face intersecting a main axis of the device, the set of optical rotators comprising a NRR and a RR,
      a second polarization beam splitter (PBS) optically coupled to the set of optical rotators at a side opposite to the first PBS, wherein at least one adjustable non-liner interferometer (ANLI) is optically coupled to the second PBS at a side opposite to the set of optical rotators,
      a first optical reflector optically coupled to a face of the first PBS not intersecting the main axis and optically coupled to a first output port, and
      a second optical reflector optically coupled to a face of the second PBS not intersecting the main axis and optically coupled to a second output port;
   the at least one ANLI optically coupled to the separating means, wherein the at least one ANLI in a first state rotates a polarization of the first set of channels, wherein the at least one ANLI in a second state rotates a polarization of the second set of channels, and wherein, the at least one ANLI reflects the first and second set of channels to the separating means in the return direction;
   the first output port optically coupled to the separating means for outputting the first set of channels when the at least one ANLI is in the first state and the second set of channels when the at least one ANLI is in the second state; and
   the second output port optically coupled to the separating means for outputting the second set of channels when the at least one ANLI is in the first state and the first set of channels when the at least one ANLI is in the second state.

5. The device of claim 4, wherein the at least one input port comprises:
   an optical collimator;
   a birefringent walk-off plate optically coupled to the optical collimator; and
   an input reciprocal optical rotator intercepting a portion of a light from the birefringent walk-off plate.

6. A switchable interleaved channel separator device, comprising:
   at least one input port for inputting at least one optical signal in a return direction;
   a separating means optically coupled to the at least one input port for separating the at least one optical signal traversing through the separating means in a forward direction into a first set of channels and a second set of channels interleaved with the first set of channels;
   at least one adjustable non-liner interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second set of channels to the separating means in the return direction, wherein the at least one ANLI comprises:
      a first glass plate optically coupled to a second plate, forming a cavity therebetween, a first reflective coating with a first reflectivity residing inside the cavity and on the first glass plate,
a piezoelectric element residing inside the cavity and coupled to the second plate, wherein a thickness of the piezoelectric element is adjustable, wherein the thickness determines whether the at least one ANLI is in the first state or the second state,
second reflective coating with a second reflectivity residing inside the cavity and on the piezoelectric element,
a first waveplate with a first optical retardance residing outside the cavity and optically coupled to the first glass plate and the separating means, and
a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels;
a first output port optically coupled to the separating means for outputting the first set of channels when the at least one ANLI is in the first state and the second set of channels when the at least one ANLI is in the second state; and
a second output port optically coupled to the separating means for outputting the second set of channels when the at least one ANLI is in the first state and the first set of channels when the at least one ANLI is in the second state.

7. A switchable interleaved channel separator device, comprising:
at least one input port for inputting at least one optical signal in a forward direction;
a separating means optically coupled to the at least one input port for separating the at least one optical signal traversing through the separating means in a return direction into a first set of channels and a second set of channels interleaved with the first set of channels;
at least one adjustable non-liner interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second set of channels to the separating means in the return direction, wherein the at least one ANLI comprises:
an enclosure comprising a window,
a first glass plate residing inside the enclosure and optically coupled to the window,
a second plate residing inside the enclosure and optically coupled to the first glass plate, forming a cavity therebetween,
a first reflective coating with a first reflectivity residing inside the cavity and on the first glass plate,
a second reflective coating with a second reflectivity residing inside the cavity and on the second plate,
a first waveplate with a first optical retardance residing outside the enclosure and optically coupled to the window and the separating means, and
a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels,
wherein an air pressure within the enclosure is variable, wherein a value of the air pressure determines whether the at least one ANLI is in the first state or the second state;
a first output port optically coupled to the separating means for outputting the first set of channels when the at least one ANLI is in the first state and the second set of channels when the at least one ANLI is in the second state; and
a second output port optically coupled to the separating means for outputting the second set of channels when the at least one ANLI is in the first state and the first set of channels when the at least one ANLI is in the second state.

8. A system, comprising:
an optical input;
a first switchable interleaved channel separator device optically coupled to the optical input; and
a plurality of second switchable interleaved channel separator devices, wherein two of the plurality of second switchable interleaved channel separators are optically coupled to the first switchable interleaved channel separator device, in a parallel cascade configuration, wherein the first switchable interleaved channel separator device and the plurality of second switchable interleaved channel separator devices comprises:
an input port for inputting an optical signal in a forward direction,
a separating means optically coupled to the input port for separating the optical signal traversing through the separating means in a return direction into a first set of channels and a second set of channels interleaved with the first set of channels,
at least one adjustable non-liner interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second set of channels to the separating means in the return direction,
a first output port optically coupled to the separating means for outputting the first set of channels when the at least one ANLI is in the first state and the second set of channels when the at least one ANLI is in the second state, and
a second output port optically coupled to the separating means for outputting the second set of channels when the at least one ANLI is in the first state and the first set of channels when the at least one ANLI is in the second state.

9. The system of claim 8, wherein the at least one ANLI comprises:
a first glass plate optically coupled to a second plate, forming a cavity therebetween;
a first reflective coating with a first reflectivity residing inside the cavity and on the first glass plate;
a second reflective coating with a second reflectivity residing inside the cavity and on the second plate;
a first waveplate with a first optical retardance residing outside the cavity and optically coupled to the first glass plate; and
a second waveplate with a second optical retardance residing inside the cavity and optically coupled to the first and second reflective coatings, wherein a tilt angle of the first waveplate is adjustable, wherein the tilt angle determines whether the at least one ANLI is in the first state or the second state, wherein a combination of values for the first reflectivity, the first optical retardance, and the second optical retardance affects spectral bandwidths for the first and second sets of channels.

10. The system of claim 8, wherein the at least one ANLI comprises:

an enclosure comprising a window;

a first glass plate residing inside the enclosure and optically coupled to the window;

a second plate residing inside the enclosure and optically coupled to the first glass plate, forming a cavity therebetween;

a first reflective coating with a first reflectivity residing inside the cavity and on the first glass plate;

a second reflective coating with a second reflectivity residing inside the cavity and on the second plate;

a first waveplate with a first optical retardance residing outside the enclosure and optically coupled to the window; and a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels, wherein an air pressure within the enclosure is variable, wherein a value of the air pressure determines whether the at least one ANLI is in the first state or the second state.

11. A system, comprising:

an optical input; and a plurality of switchable interleaved channel separator devices optically coupled to the optical input, wherein the plurality of switchable interleaved channel separators are optically coupled in a parallel cascade configuration, wherein each switchable interleaved channel separator device comprises:

an input port for inputting an optical signal in a forward direction, a separating means optically coupled to the input port for separating the optical signal traversing through the separating means in a return direction into a first set of channels and a second set of channels interleaved with the first set of channels, at least one, adjustable non-liner interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second set of channels to the separating means in the return direction, a first output port optically coupled to the separating means for outputting the first set of channels when the at least one ANLI is in the first state and the second set of channels when the at least one ANLI is in the second state, and a second output port optically coupled to the separating means for outputting the second set of channels when the at least one ANLI is in the first state and the first set of channels when the at least one ANLI is in the second state, wherein the separating means comprises:

a first polarization beam splitter (PBS) optically coupled to the input port, a set of optical rotators optically coupled to the first PBS at a face intersecting a main axis of the device, the set of optical rotators comprising a NRR and a RR, a second polarization beam splitter (PBS) optically coupled to the set of optical rotators at a side opposite to the first PBS, wherein the at least one ANLI is optically coupled to the second PBS at a side opposite to the set of optical rotators, a first optical reflector optically coupled to a face of the first PBS not intersecting the main axis and optically coupled to the first output port, and a second optical reflector optically coupled to a face of the second PBS not intersecting the main axis and optically coupled to the second output port.

12. The system of claim 11, wherein the at least one input port comprises:

an optical collimator;

a birefringent walk-off plate optically coupled to the optical collimator; and an input reciprocal optical rotator intercepting a portion of a light from the birefringent walk-off plate.

13. A system, comprising:

an optical input; and a plurality of switchable interleaved channel separator devices optically coupled to the optical input, wherein the plurality of switchable interleaved channel separators are optically coupled in a parallel cascade configuration, wherein each switchable interleaved channel separator device comprises:

an input port for inputting an optical signal in a forward direction, a separating means optically coupled to the input port for separating the optical signal traversing through the separating means in a return direction into a first set of channels and a second set of channels interleaved with the first set of channels, at least one adjustable non-liner interferometer (ANLI) optically coupled to the separating means, wherein the at least one ANLI in a first state rotates a polarization of the first set of channels, wherein the at least one ANLI in a second state rotates a polarization of the second set of channels, and wherein the at least one ANLI reflects the first and second set of channels to the separating means in the return direction, wherein the at least one ANLI comprises:

a first glass plate optically coupled to a second plate, forming a cavity therebetween, a first reflective coating with a first reflectivity residing inside the cavity and on the first glass plate, a piezoelectric element residing inside the cavity and coupled to the second plate, wherein a thickness of the piezoelectric element is adjustable, wherein the thickness determines whether the at least one ANLI is in the first state or the second state, a second reflective coating with a second reflectivity residing inside the cavity and on the piezoelectric element, a first waveplate with a first optical retardance residing outside the cavity and optically coupled to the first glass plate, and a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels, a first output port optically coupled to the separating means for outputting the first set of channels when the at least one ANLI is in the first state and the second set of channels when the at least one ANLI is in the second state, and a second output port optically coupled to the separating means for outputting the second set of channels when the at least one ANLI is in the first state and the first set of channels when the at least one ANLI is in the second state.

14. A system, comprising:

a first plurality of sets of channel separators, wherein each set of the first plurality of sets of channel separators is in a parallel cascade configuration;

a plurality of switchable interleaved channel separator devices comprising a plurality of input ports and a plurality of output ports, wherein the plurality of input ports is optically coupled to the first plurality of sets of channel separators, wherein each switchable interleaved channel separator device comprises:

a first input port for inputting a first set of channels in a forward direction, a second input port for inputting a second set of channels in the forward direction, a separating means optically coupled to the first and second input ports, wherein the separating means separates the first set of channels traversing through the device in the return direction into a first subset of channels and a second subset of channels interleaved with the first subset of channels, wherein the separating means separates the second set of channels traversing through the device in the return direction into a third subset of channels and a fourth subset of channels interleaved with the third subset of channels, at least one adjustable non-liner interferometer (ANLI) optically coupled to the separating means, wherein the at least one ANLI in a first state rotates a polarization of the first and third subsets of channels, wherein the at least one ANLI in a second state rotates a polarization of the second and fourth subsets of channels, and wherein the at least one ANLI reflects the first, second, third, and fourth subsets of channels to the separating means in the return direction, a first output port optically coupled to the separating means, wherein the first output port outputs the first and fourth subsets of channels when the at least one ANLI is in the first state, wherein the first output port outputs the second and third subsets of channels when the at least one ANLI is in the second state, and a second output port optically coupled to the separating means, wherein the second output port outputs the second and third subsets of channels when the at least one ANLI is in the first state, wherein the second output port outputs the first and fourth subsets of channels when the at least one ANLI is in the second state; and a second plurality of sets of channel separators optically coupled to the plurality of output ports of the plurality of switchable interleaved channel separator devices, wherein each set of the second plurality of sets of channel separators is in a parallel cascade configuration.

15. The system of claim 14, wherein the at least one ANLI comprises:

a first glass plate optically coupled to a second plate, forming a cavity therebetween;

a first reflective coating with a first reflectivity residing inside the cavity and on the first glass plate;

a second reflective coating with a second reflectivity residing inside the cavity and on the second plate;

a first waveplate with a first optical retardance residing outside the cavity and optically coupled to the first glass plate; and a second waveplate with a second optical retardance residing inside the cavity and optically coupled to the first and second reflective coatings, wherein a tilt angle of the first waveplate is adjustable, wherein the tilt angle determines whether the at least one ANLI is in the first state or the second state, wherein a combination of values for the first reflectivity, the first optical retardance, and the second optical retardance affects spectral bandwidths for a first, second, third, and fourth sets of channels.

16. The device of claim 14, wherein the at least one ANLI comprises:

an enclosure comprising a window;

a first glass plate residing inside the enclosure and optically coupled to the window;

a second plate residing inside the enclosure and optically coupled to the first glass plate, forming a cavity therebetween;

a first reflective coating with a first reflectivity residing inside the cavity and on the first glass plate;

a second reflective coating with a second reflectivity residing inside the cavity and on the second plate;

a first waveplate with a first optical retardance residing outside the enclosure and optically coupled to the window; and a second waveplate with a second optical retardance residing inside the cavity and optically coupled to the first and second reflective coatings, wherein a combination of values for the first reflectivity, the first optical retardance, and the second optical retardance affects spectral bandwidths for the first and second sets of channels, wherein an air pressure within the enclosure is variable, wherein a value of the air pressure determines whether the at least one ANLI is in the first state or the second state.

17. A system, comprising:

a first plurality of sets of channel separators, wherein each set of the first plurality of sets of channel separators is in a parallel cascade configuration;

a plurality of switchable interleaved channel separator devices comprising a plurality of input ports and a plurality of output ports, wherein the plurality of input ports is optically coupled to the first plurality of sets of channel separators, wherein each switchable interleaved channel separator device comprises:

a first input port for inputting a first set of channels in a forward direction, a second input port for inputting a second set of channels in the forward direction, a separating means optically coupled to the first and second input ports, wherein the separating means separates the first set of channels traversing through the device in the return direction into a first subset of channels and a second subset of channels interleaved with the first subset of channels, wherein the separating means separates the second set of channels traversing through the device in the return direction into a third subset of channels and a fourth subset of channels interleaved with the third subset of channels, at least one adjustable non-liner interferometer (ANLI) optically coupled to the separating means, wherein the at least one ANLI in a first state rotates a polarization of the first and third subsets of channels, wherein the at least one ANLI in a second state rotates a polarization of the second and fourth subsets of channels, and wherein the at least one ANLI reflects the first, second, third, and fourth subsets of channels to the separating means in the return direction, wherein the at least one ANLI comprises:
 a first glass plate optically coupled to a second plate, forming a cavity therebetween,
 a first reflective coating with a first reflectivity residing inside the cavity and on the first glass plate,
 a piezoelectric element residing inside the cavity and coupled to the second plate, wherein a thickness of the piezoelectric element is adjustable, wherein the thickness determines whether the at least one ANLI is in the first state or the second state,
 a second reflective coating with a second reflectivity residing inside the cavity and on the piezoelectric element,
 a first waveplate with a first optical retardance residing outside the cavity and optically coupled to the first glass plate, and
 a second waveplate with a second optical retardance residing inside the cavity and optically coupled to the first and second reflective coatings, wherein a combination of values for the first reflectivity, the first optical retardance, and the second optical retardance affects spectral bandwidths for the first, second, third, and fourth sets of channels, a first output port optically coupled to the separating means, wherein the first output port outputs the first and fourth subsets of channels when the at least one ANLI is in the first state, wherein the first output port outputs the second and third subsets of channels when the at least one ANLI is in the second state, and a second output port optically coupled to the separating means, wherein the second output port outputs the second and third subsets of channels when the at least one ANLI is in the first state, wherein the second output port outputs the first and fourth subsets of channels when the at least one ANLI is in the second state; and a second plurality of sets of channel separators optically coupled to the plurality of output ports of the plurality of switchable interleaved channel separator devices, wherein each set of the second plurality of sets of channel separators is in a parallel cascade configuration.

18. An optical add/drop module (OADM), comprising:
a first switchable interleaved channel separator device, comprising:
 a first input port of the first switchable interleaved channel separator device,
 a second input port of the first switchable interleaved channel separator device,
 a first output port of the first switchable interleaved channel separator device, and
 a second output port of the first switchable interleaved channel separator device; and a second switchable interleaved channel separator device, comprising:
 a first input port of the second switchable interleaved channel separator device optically coupled to the second output port of the first switchable interleaved channel separator device,
 a second input port of the second switchable interleaved channel separator device,
 a first output port of the second switchable interleaved channel separator device optically coupled to the second input port of the first switchable interleaved channel separator device, and
 a second output port of the second switchable interleaved channel separator device, wherein the first and second switchable interleaved channel separator devices each further comprises:
 a separating means optically coupled to the first and second input ports of the first or second switchable interleaved channel separator device,
 wherein the separating means separates a first optical signal from the first input port of the first or second switchable interleaved channel separator device into a first set of channels and a second set of channels interleaved with the first set of channels, wherein the first optical signal is traversing through the separating means in a return direction,
 wherein the separating means separates a second optical signal from the second input port of the first or second switchable interleaved channel separator device into a third set of channels and a fourth set of channels interleaved with the third set of channels, wherein the second optical signal is traversing through the separating means in the return direction, and
at least one adjustable non-liner interferometer (ANLI) optically coupled to the separating means, wherein the at least one ANLI in a first state rotates a polarization of the first and third sets of channels,
wherein the at least one ANLI in a second state rotates a polarization of the second and fourth sets of channels, wherein the at least one ANLI reflects the first, second, third, and fourth sets of channels to the separating means in the return direction,
 wherein when the ANLI is in the first state, the first output port of the first or second switchable interleaved channel separator device outputs the first and fourth sets of channels, and the second output port of the first or second switchable interleaved channel separator device outputs the second and third sets of channels,
 wherein when the ANLI is in the second state, the first output port of the first or second switchable interleaved channel separator device outputs the second and third sets of channels, and the second output port of the first or second switchable interleaved channel separator device outputs the first and fourth sets of channels,
 wherein the at least one ANLI comprises:
  a first glass plate optically coupled to a second plate, forming a cavity therebetween,
  a first reflective coating with a first reflectivity residing inside the cavity and on the first glass plate, a piezoelectric element residing inside the cavity and coupled to the second plate, wherein a thickness of the piezoelectric element is adjustable, wherein the thickness determines whether the at least one ANLI is in the first state or the second state, a second reflective coating with a second reflectivity residing inside the cavity and on the piezoelectric element, a first waveplate with a first optical retardance residing outside the cavity and optically coupled to the first glass plate, and a second waveplate with a second optical retardance residing inside the cavity and optically coupled to the first and second reflective coatings, wherein a combination of values for the first reflectivity, the first optical retardance, and the second optical retardance affects spectral bandwidths for the first, second, third, and fourth sets of channels.

19. A system, comprising:

an optical add/drop module (OADM), comprising:
  a first switchable interleaved channel separator device, comprising:
    a first input port of the first switchable interleaved channel separator device,
    a second input port of the first switchable interleaved channel separator device,
    a first output port of the first switchable interleaved channel separator device, and
    a second output port of the first switchable interleaved channel separator device; and
  a second switchable interleaved channel separator device, comprising:
    a first input port of the second switchable interleaved channel separator device receiving a first plurality of channels from the second output port of the first switchable interleaved channel separator device,
    a second input port of the second switchable interleaved channel separator device,
    a first output port of the second switchable interleaved channel separator device delivering a second plurality of channels to the second input port of the first switchable interleaved channel separator device, and
    a second output port of the second switchable interleaved channel separator device,
  wherein the first and second switchable interleaved channel separator devices each further comprises:
    a separating means optically coupled to the first and second input ports of the first or second switchable interleaved channel separator device,
      wherein the separating means separates a first optical signal from the first input port of the first or second switchable interleaved channel separator device into a first set of channels and a second set of channels interleaved with the first set of channels, wherein the first optical signal is traversing through the separating means in a return direction,
      wherein the separating means separates a second optical signal from the second input port of the first or second switchable interleaved channel separator device into a third set of channels and a fourth set of channels interleaved with the third set of channels, wherein the second optical signal is traversing through the separating means in the return direction, and
    at least one adjustable non-liner interferometer (ANLI) optically coupled to the separating means, wherein the at least one ANLI in a first state rotates a polarization of the first and third sets of channels, wherein the at least one ANLI in a second state rotates a polarization of the second and fourth sets of channels, wherein the at least one ANLI reflects the first, second, third, and fourth sets of channels to the separating means in the return direction,
      wherein when the ANLI is in the first state, the first output port of the first or second switchable interleaved channel separator device outputs the first and fourth sets of channels, and the second output port of the first or second switchable interleaved channel separator device outputs the second and third sets of channels,
      wherein when the ANLI is in the second state, the second output port of the first or second switchable interleaved channel separator device outputs the second and third sets of channels, and the second output port of the first or second switchable interleaved channel separator device outputs the first and fourth sets of channels;
  a controller electronically coupled to the OADM;
  an optical tap optically coupled to the first input port of the first switchable interleaved channel separator device;
  an optical tap line coupled to the optical tap and the controller for transmitting an optical service channel; and
  an add/drop line optically coupled to the an output port of the OADM.

20. The system of claim 19, wherein the at least one ANLI comprises:
  an enclosure comprising a window;
  a first glass plate residing inside the enclosure and optically coupled to the window;
  a second plate residing inside the enclosure and optically coupled to the first glass plate, forming a cavity therebetween;
  a first reflective coating with a first reflectivity residing inside the cavity and on the first glass plate;
  a second reflective coating with a second reflectivity residing inside the cavity and on the second plate;
  a first waveplate with a first optical retardance residing outside the enclosure and optically coupled to the window; and
  a second waveplate with a second optical retardance residing inside the cavity and optically coupled to the first and second reflective coatings, wherein a combination of values for the first reflectivity, the first optical retardance, and the second optical retardance affects spectral bandwidths for the first, second, third, and fourth sets of channels,
  wherein an air pressure within the enclosure is variable, wherein a value of the air pressure determines whether the at least one ANLI is in the first state or the second state.

21. A system, comprising:
an optical add/drop module (OADM), comprising:
  a first switchable interleaved channel separator device, comprising:

a first input port of the first switchable interleaved channel separator device,
a second input port of the first switchable interleaved channel separator device,
a first output port of the first switchable interleaved channel separator device, and
a second output port of the first switchable interleaved channel separator device;
a second switchable interleaved channel separator device, comprising:
a first input port of the second switchable interleaved channel separator device optically coupled to the second output port of the first switchable interleaved channel separator device,
a second input port of the second switchable interleaved channel separator device,
a first output port of the second switchable interleaved channel separator device optically coupled to the second input port of the first switchable interleaved channel separator device, and
a second output port of the second switchable interleaved channel separator device,
wherein the first and second switchable interleaved channel separator devices each further comprises:
a separating means optically coupled to the first and second input ports of the first or second switchable interleaved channel separator device,
wherein the separating means separates a first optical signal from the first input port of the first or second switchable interleaved channel separator device into a first set of channels and a second set of channels interleaved with the first set of channels, wherein the first optical signal is traversing through the separating means in a return direction,
wherein the separating means separates a second optical signal from the second input port of the first or second switchable interleaved channel separator device into a third set of channels and a fourth set of channels interleaved with the third set of channels, wherein the second optical signal is traversing through the separating means in the return direction, and
at least one adjustable non-liner interferometer (ANLI) optically coupled to the separating means, wherein the at least one ANLI in a first state rotates a polarization of the first and third sets of channels, wherein the at least one ANLI in a second state rotates a polarization of the second and fourth sets of channels, wherein the at least one ANLI reflects the first, second, third, and fourth sets of channels to the separating means in the return direction,
wherein when the ANLI is in the first state, the first output port of the first or second switchable interleaved channel separator device outputs the first and fourth sets of channels, and the second output port of the first or second switchable interleaved channel separator device outputs the second and third sets of channels,
wherein when the ANLI is in the second state, the second output port of the first or second switchable interleaved channel separator device outputs the second and third sets of channels, and the second output port of the first or second switchable interleaved channel separator device outputs the first and fourth sets of channels, wherein the at least one ANLI comprises:
a first glass plate optically coupled to a second plate, forming a cavity therebetween,
a first reflective coating with a first reflectivity residing inside the cavity and on the first glass plate,
a piezoelectric element residing inside the cavity and coupled to the second plate, wherein a thickness of the piezoelectric element is adjustable, wherein the thickness determines whether the at least one ANLI is in the first state or the second state,
a second reflective coating with a second reflectivity residing inside the cavity and on the piezoelectric element,
a first waveplate with a first optical retardance residing outside the cavity and optically coupled to the first glass plate, and
a second waveplate with a second optical retardance residing inside the cavity and optically coupled to the first and second reflective coatings, wherein a combination of values for the first reflectivity, the first optical retardance, and the second optical retardance affects spectral bandwidths for the first, second, third, and fourth sets of channels;
a controller electronically coupled to the OADM;
an optical tap optically coupled to the first input port of the first switchable interleaved channel separator device;
an optical tap line coupled to the optical tap and the controller for transmitting an optical service channel; and an add/drop line optically coupled to the an output port of the OADM.

* * * * *